US010310702B2

United States Patent
Jang et al.

(10) Patent No.: US 10,310,702 B2
(45) Date of Patent: Jun. 4, 2019

(54) IMAGE DISPLAY APPARATUS FOR CONTROLLING AN OBJECT DISPLAYED ON A SCREEN AND METHOD FOR OPERATING IMAGE DISPLAY APPARATUS

(71) Applicant: LG ELECTRONICS INC., Seoul (KR)

(72) Inventors: Saehun Jang, Seoul (KR); Sihwa Park, Seoul (KR); Jungdo Kim, Seoul (KR); Hyeonhui Kim, Seoul (KR); Jiho Choi, Seoul (KR); Junhee Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 14/913,869

(22) PCT Filed: Sep. 27, 2013

(86) PCT No.: PCT/KR2013/008706
§ 371 (c)(1),
(2) Date: Feb. 23, 2016

(87) PCT Pub. No.: WO2015/046649
PCT Pub. Date: Apr. 2, 2015

(65) Prior Publication Data
US 2016/0202872 A1 Jul. 14, 2016

(51) Int. Cl.
*G06F 3/0481* (2013.01)
*G06T 13/80* (2011.01)
(Continued)

(52) U.S. Cl.
CPC .......... *G06F 3/04812* (2013.01); *G06F 3/033* (2013.01); *G06F 3/038* (2013.01);
(Continued)

(58) Field of Classification Search
CPC ............. G06F 2203/0381; G06F 3/033; G06F 3/0346; G06F 3/038; G06F 3/04812;
(Continued)

(56) References Cited

U.S. PATENT DOCUMENTS

| 2005/0166159 A1* | 7/2005 | Mondry | G06F 3/0486 715/769 |
| 2006/0070007 A1* | 3/2006 | Cummins | G06F 3/0486 715/769 |

(Continued)

FOREIGN PATENT DOCUMENTS

| JP | 2000-293291 A | 10/2000 |
| KR | 10-2009-0129192 A | 12/2009 |
| KR | 10-2012-0131258 A | 12/2012 |

OTHER PUBLICATIONS

Youtube Adobe Illustrator Tutorial https://www.youtube.com/watch?v=mPQ8hcWNZ7Q (Year: 2012).*

(Continued)

*Primary Examiner* — Tan H Tran
(74) *Attorney, Agent, or Firm* — KED & Associates, LLP

(57) ABSTRACT

An image display apparatus and a method for operating an image display apparatus are disclosed. According to embodiments of the present invention, the image display apparatus comprises: a microphone; a display unit configured to output a pointer on a screen; and a controller generating a representative image corresponding to a first voice signal and attaching the representative image to the pointer when the first voice signal is input into the microphone in a state in which the pointer is output on the screen. Here, the controller enables the representative image attached to the pointer to be displayed along a moving path of the pointer in response to the movement of the pointer on the screen and, when a specific object on the screen is selected using the pointer to which the representative image (Continued)

is attached, enables a function related to the representative image corresponding to the first voice signal to be applied to the selected specific object while a display corresponding to the selection is output.

20 Claims, 22 Drawing Sheets

(51) Int. Cl.
*G06F 3/033* (2013.01)
*G06F 3/0484* (2013.01)
*G06F 3/0346* (2013.01)
*G06F 3/16* (2006.01)
*G06F 3/038* (2013.01)

(52) U.S. Cl.
CPC ........ *G06F 3/0346* (2013.01); *G06F 3/04817* (2013.01); *G06F 3/04842* (2013.01); *G06F 3/04845* (2013.01); *G06F 3/167* (2013.01); *G06T 13/80* (2013.01); *G06F 2203/0381* (2013.01)

(58) Field of Classification Search
CPC ............. G06F 3/04817; G06F 3/04842; G06F 3/04845; G06F 3/167; G06T 13/80
See application file for complete search history.

(56) References Cited

U.S. PATENT DOCUMENTS

| | | | |
|---|---|---|---|
| 2006/0195791 A1 | 8/2006 | Johanson et al. | |
| 2007/0088557 A1* | 4/2007 | Andrew | G06F 3/167 704/270.1 |
| 2007/0288667 A1* | 12/2007 | Kamata | G06F 17/3028 710/65 |
| 2009/0055181 A1* | 2/2009 | Han | H04M 1/72552 704/251 |
| 2010/0153111 A1* | 6/2010 | Hirai | B60R 16/0373 704/251 |
| 2011/0239165 A1* | 9/2011 | Peebler | G06Q 40/04 715/856 |
| 2011/0313768 A1* | 12/2011 | Klein | G06F 3/017 704/251 |
| 2012/0176313 A1 | 7/2012 | Ryu et al. | |
| 2014/0026175 A1* | 1/2014 | Callanan | G06F 17/30855 725/112 |
| 2015/0156247 A1* | 6/2015 | Hensel | H04L 67/06 709/219 |

OTHER PUBLICATIONS

International Search Report and Written Opinion dated Jun. 3, 2014 issued in Application No. PCT/KR2013/008706.

\* cited by examiner

IMAGE DISPLAY APPARATUS FOR CONTROLLING AN OBJECT DISPLAYED ON A SCREEN AND METHOD FOR OPERATING IMAGE DISPLAY APPARATUS

CROSS-REFERENCE TO RELATED PATENT APPLICATIONS

This application is a U.S. National Stage Application under 35 U.S.C. § 371 of PCT Application No. PCT/KR2013/008706, filed Sep. 27, 2013, whose entire disclosure is hereby incorporated by reference.

TECHNICAL FIELD

The present disclosure relates to an image display apparatus and a method for operating the same, and more particularly, an image display apparatus capable of recognizing a user's gesture input, and a method for operating the same.

BACKGROUND ART

An image display apparatus includes all of devices which receive and display broadcast, or record and reproduce videos, and devices which record and reproduce audio. The image display apparatus includes a television, a computer monitor, a projector, a tablet, a navigator, a digital broadcast receiver (digital television) and the like, for example.

As it becomes multifunctional, an image display apparatus can be allowed to capture still images or moving images, play games, receive broadcast and the like, so as to be implemented as an integrated multimedia player. In addition, the image display apparatus has recently been implemented into a smart device (for example, smart television). Accordingly, the image display apparatus may be interoperable with a mobile terminal or a computer as well as executing an Internet and the like. Also, the image display apparatus may also function as a server in a home network environment or ubiquitous environment by receiving digital broadcasts.

Meanwhile, an external input device, for example, a spatial remote controller, which is separate from the image display apparatus, may be used to operate the image display apparatus. A user may move a cursor or a pointer output on the image display apparatus by using the spatial remote controller.

In recent time, the image display apparatus has been improved even to recognize a voice input into its body and execute a function corresponding to the input voice.

As such, various user interfaces are applied to the image display apparatus to execute various operations, functions or services, and studies on using a plurality of user interfaces in a combining manner for user convenience are actively undergoing.

DISCLOSURE OF THE INVENTION

Therefore, to obviate those problems, an aspect of the detailed description is to provide an image display apparatus capable of facilitating a user-desired operation or function to be fast executed with respect to a specific object output on a screen, by using user interfaces in a combining manner, specifically, by using a user's voice signal and a pointer which is moved by an external input device, and a method of operating the same.

To achieve these and other advantages and in accordance with the purpose of the present invention, as embodied and broadly described herein, there is provided an image display apparatus including a microphone, a display unit configured to output a pointer on a screen, and a controller configured to generate a representative image corresponding to a first voice signal and attach the generated representative image to the pointer when the first voice signal is input through the microphone while the pointer is output on the screen, wherein the controller may control the representative image attached to the pointer to be output along a moving path of the pointer, in response to the movement of the pointer on the screen, and apply a function associated with the representative image corresponding to the first voice signal to a selected specific object while outputting an indicator corresponding to the selection, when the specific object on the screen is selected using the pointer with the representative image attached thereto.

In one embodiment of the present invention, when a voice indicating a predetermined function is included in the first voice signal, controller may generate the representative image by detecting an image associated with the function from a memory or a predetermined web server, and control the representative image to be continuously output in the attached state to the pointer after applying the function associated with the representative image to the selected specific object.

In one embodiment of the present invention, the apparatus may further include an interface unit configured to receive from an external input device a pointing signal for moving the pointer with the representative image attached thereto. The controller may control the representative image to be moved, in response to the pointer being moved based on the received pointing signal.

In one embodiment of the present invention, the controller may control the representative image attached to the pointer to be hidden when the movement of the pointer is not sensed for a preset period of time and the hidden representative image to be output again in response to the pointer being moved, in the state that the representative image is attached to the pointer.

In one embodiment of the present invention, the controller may control a preset animation effect or a predetermined notification sound to be output when the representative image is attached to the pointer in response to the input of the first voice signal.

In one embodiment of the present invention, the controller may control at least one object corresponding to a second voice signal to be selected based on a specific region of the screen when the second voice signal is input in a state that the pointer with the representative image attached thereto has been moved to the specific region of the screen.

In one embodiment of the present invention, the controller may generate a second image indicating additional information related to the function, attach the second image to the representative image, and control the second image to be moved according to the movement of the pointer, when the additional information related to the function is included in the first voice signal.

In one embodiment of the present invention, when a specific object on the screen is selected using the pointer with the second image and the representative image attached thereto, the controller may control the function associated with the representative image to be applied to the selected specific object based on the additional information corresponding to the second image.

In one embodiment of the present invention, the controller may generate the representative image corresponding to the first voice signal when an entrance into a voice recognition mode is sensed based on an input signal.

In one embodiment of the present invention, when the entrance of the voice recognition mode is sensed, the controller may change a shape of the pointer, and attach the representative image to the pointer in a manner of overlaying at least part of the pointer with the changed shape.

In one embodiment of the present invention, the controller may control the display unit to output a visual effect that the representative image is detached from the pointer or the representative image to disappear from the screen when the voice recognition mode is release, and output only an indicator corresponding to a selection when a specific object on the screen is selected using the pointer from which the representative image has disappeared.

In one embodiment of the present invention, when a third voice signal is input through the microphone while a first representative image is attached to the pointer, the controller may change the first representative image into a second representative image corresponding to the third voice signal, and control a function corresponding to the changed second representative image to be executed with respect to the selected specific object.

In one embodiment of the present invention, when a fourth voice signal is input through the microphone after specific objects are selected using the pointer with the representative image attached thereto, the controller may control the display unit to attach thumbnail images of the selected specific objects to the representative image.

In one embodiment of the present invention, the controller may control the thumbnail images not to be moved according to the movement of the pointer, and control a specific object corresponding to at least one selected thumbnail image to be deselected when the at least one thumbnail image is selected from the thumbnail images using the pointer with the representative image attached thereto.

In one embodiment of the present invention, the controller may control the display unit to output thumbnail images of objects for which the function corresponding to the first voice signal has been executed and thumbnail images of objects for which the function is to be executed, in a visually distinguishing manner.

In one embodiment of the present invention, when it is recognized that a plurality of functions are included in the first voice signal, the controller may generate a first representative image corresponding to a first function and a second representative image corresponding to a second function, respectively, and attach the first and second representative images to the pointer, and control the first and second representative images to be moved according to the movement of the pointer.

In one embodiment of the present invention, the controller may control the first representative image corresponding to the first function, which is to be executed earlier, to be attached closer to the pointer. The controller may control the first representative image to be detached from the pointer or disappear when the first function is executed, and control the second representative image corresponding to the second function, which is to be executed next, to be attached close to the pointer.

In one embodiment of the present invention, when a voice indicating a predetermined function is not included in the first voice signal, the controller may generate a text image converted from the first voice signal through voice recognition, as the representative image, and output the text image on a specific object when the specific object on the screen is selected using the pointer with the representative image attached thereto.

To achieve these and other advantages and in accordance with the purpose of the present invention, as embodied and broadly described herein, there is provided a method for operating an image display apparatus, the method including outputting a pointer on a screen, the pointer being moved according to a pointing signal received from an external input device, generating a representative image corresponding to a first voice signal and attaching the generated representative image to the pointer when the first voice signal is input through a microphone while the pointer is output on the screen, outputting the representative image attached to the pointer along a moving path of the pointer, in response to the pointer being moved on the screen, and applying a function associated with the representative image corresponding to the first voice signal to a selected object while outputting an indicator corresponding to the selection, when the specific object on the screen is selected using the pointer with the representative image attached thereto.

In one embodiment of the present invention, the attaching to the pointer may include, when a voice indicating a predetermined function is included in the first voice signal, generating the representative image by detecting an image associated with the function from a memory or a predetermined web server. The attaching to the pointer may further include applying the function associated with the representative image to the selected specific object and thereafter controlling the representative image to be continuously output in the attached state to the pointer.

ADVANTAGEOUS EFFECT

Therefore, in an image display apparatus and a method of operating the same according to the present invention, when a user inputs a voice command, an icon indicating a function corresponding to the input voice command may be attached to a pointer. This may allow the user to immediately recognize an operation or function desiring to execute from outside and enable a feedback thereof. Also, the icon can be moved according to a movement of the pointer. When a specific object is selected by the pointer, a function corresponding to the icon attached to the pointer can immediately be executed for the selected object. Specifically, this may provide user convenience when the user desires to execute the same function for a plurality of objects or should repetitively perform the same operation.

For example, when the same text is repetitively input or a plurality of objects included in different windows or applications should be uploaded on the same SNS, the user can solve such case merely by selecting a specific region or object using a pointer to which an icon is attached.

MODES FOR CARRYING OUT THE PREFERRED EMBODIMENTS

Description will now be given in detail according to exemplary embodiments disclosed herein with reference to the accompanying drawings, to help understanding and practicing the technical scope of the present invention by those skilled in the art to which the present invention belongs. However, the present invention can be implemented into various forms, and may not be limited to the following exemplary embodiments. For the sake of brief description with reference to the drawings, the same or equivalent components may be provided with the same or similar reference numbers, and description thereof will not be repeated.

Throughout this specification, an image display apparatus may include all of devices which receive and display broadcast, or record and reproduce videos, and devices which record and reproduce audio.

Figure 1:
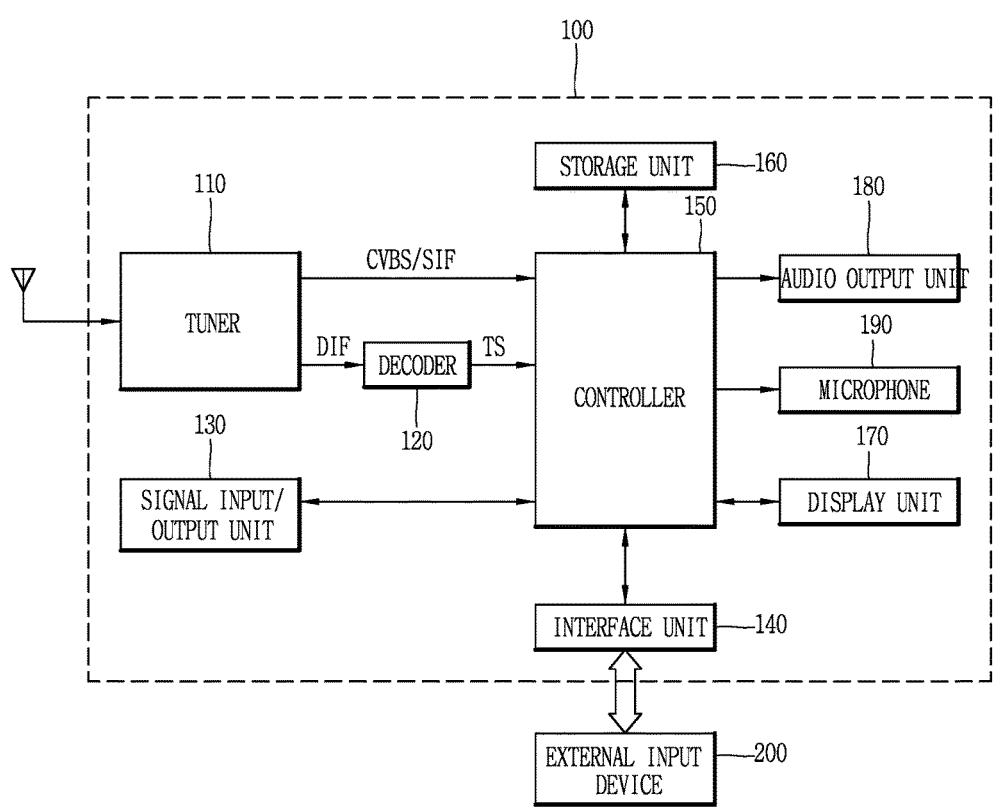
FIG. 1 is a block diagram of an image display apparatus and an external input device in accordance with the present invention.

FIG. 1 is a block diagram illustrating an image display apparatus 100 and an external input device 200 in accordance with the present invention. The image display apparatus 100 may include a tuner 110, a decoder 120, a signal input/output unit 130, an interface unit 140, a controller 150, a storage unit 160, a display 170 and an audio output module 180. The external input device 200 may be a separate device from the image display apparatus 100 or may be included as one component of the image display apparatus 100.

Referring to FIG. 1, the tuner 110 may select a radio frequency (RF) broadcast signal, which corresponds to a channel selected by a user, among RF broadcast signals received through an antenna, and convert the selected RF broadcast signal into a medium frequency signal or a baseband image (video)/audio signal. For example, when the RF broadcast signal is a digital broadcast signal, the tuner 110 may convert the RF broadcast signal into a digital IF signal (DIF). On the other hand, when the RF broadcast signal is an analog broadcast signal, the tuner 110 may convert the RF broadcast signal into an analog baseband video/audio signal (CVBS/SIF). The tuner 110 may thus be a hybrid tuner which is capable of processing the digital broadcast signal and the analog broadcast signal.

The digital IF signal (DIF) output from the tuner 110 may be input into the decoder 120, while the analog baseband video/audio signal (CVBS/SIF) output from the tuner 110 may be input into the controller 150.

The tuner 110 may receive a signal carrier RF broadcast signal according to an advanced television systems committee (ATSC) standard or a multi-carrier RF broadcast signal according to a digital video broadcasting (DVB) standard.

Although the drawing illustrates one tuner 110, the present disclosure may not be limited to this. The display apparatus 100 may include a plurality of tuners, for example, first and second tuners. In this case, the first tuner may receive a first RF broadcast signal corresponding to a broadcasting channel selected by a user, and the second tuner may receive a second RF broadcast signal corresponding to a pre-stored broadcasting channel in a sequential or periodical manner. Similar to the first tuner, the second tuber may convert an RF broadcast signal into a digital IF signal (DIF) or an analog baseband video or audio signal (CVBS/SIF).

The decoder 120 may receive the digital IF signal (DIF) converted by the tuner 110 and demodulate the received signal.

When the DIF output from the tuner 110 is a signal according to the ATSC standard, the decoder 120 may perform 8-vestigal side band (8-VSB) demodulation. The 8-VSB demodulation refers to a demodulation by a vestigial side band modulation method of a single carrier amplitude modulation using a National Television System Committee (NTSC) frequency band. Here, the decoder 120 may also perform channel decoding, such as trellis decoding, de-interleaving, reed Solomon decoding and the like. To this end, the decoder 120 may include a trellis decoder, de-interleaver, a reed Solomon decoder and the like.

When the digital IF signal (DIF) output from the tuner 110 is a signal according to the DVB standard, the decoder 120 may perform a coded orthogonal frequency division modulation (COFDMA) demodulation. Here, the decoder 120 may also perform convolution decoding, de-interleaving, reed Solomon decoding and the like. To this end, the decoder 120 may include a convolution decoder, a de-interleaver, a reed Solomon decoder and the like The decoder 120 may output a stream signal TS after performing such demodulation and channel decoding. In this instance, the stream signal may be a signal in which a video signal, an audio signal and a data signal are multiplexed. For example, the stream signal (TS) may be an MPEG-2 transport stream (TS) signal obtained by multiplexing an MPEG-2 video signal and a Dolby AC-3 audio signal. An MPEG-2 TS signal may include a 4-byte header and a 184-byte payload.

As such, the signal output from the decoder 120 may be input into the controller 150, and demultiplexing, image/voice signal processing and the like may be performed for the signal.

The signal input/output unit 130 may perform signal input and output operations by being connected in a wired/wireless manner to external devices, such as a digital versatile disk (DVD) player, a blu-ray player, a game player, a camera, a camcorder, a computer (notebook computer), a set-top box, a portable device, a smart phone and the like. To this end, the signal input/output unit 130 may include an A/V input/output unit for connection with a wired network and a wireless communication unit for connection with a wired network.

The A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, etc. A digital signal input through such terminals may be transmitted to the controller 150. An analog signal input through the CVBS terminal and the S-video terminal may be converted into a digital signal through an analogue/digital conversion unit (not shown), and then may be transmitted to the controller 150.

The wireless communication unit may execute wireless Internet access. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like. The wireless communication unit may execute short-range wireless communication with other electronic devices. The wireless communication unit, for example, may execute short-range wireless communication according to communication standards, such as Bluetooth, radio frequency identification (RFID), infrared data association (IrDA), ultra wideband (UWB), Zigbee and the like.

The signal input/output unit 130 may access a predetermined web page via a wired/wireless network to transmit and receive data to and from a corresponding server. In addition, the signal input/output unit 130 may receive contents or data, for example, contents such as movies, advertisements, games, video-on-demands (VODs), broadcast signals, etc., and relevant information, provided by a content provider or a network operator. The signal input/output unit 130 may receive update information and an update file of firmware provided by a network operator or may select a desired application among applications open to the public and receive the same, via a wired/wireless network.

The signal input/output unit 130 may deliver a video signal, an audio signal, and a data signal provided from any of the earlier-noted external devices to the controller 150. Also, the signal input/output unit 130 may deliver video signals, audio signals, and data signals carrying various media files stored in an external storage device such as a memory device, a hard disk, etc., to the controller 150. Also, the signal input/output unit 130 may deliver a video signal, an audio signal, or a data signal processed by the controller 150 to the external device or any other external device.

In more detail, the signal input/output unit 130 may be connected to a set-top box, for example, a set-top box for an Internet protocol TV (IPTV), through at least one of the various terminals as mentioned above to perform a signal input and output operation. Also, the signal input/output unit 130 may deliver a video signal, an audio signal, and a data signal processed by the set-top box for an IPTV to the controller 150, such that bi-directional communication is available. The signal input/out unit 130 may deliver the signals processed by the controller 150 to the set-top box for an IPTV. Here, the IPTV may include an ADSL-TV, a VDSL-TV and an FTTH-TV, etc., differentiated according to a transmission network. The IPTV may include a TV over DSL, a video over DSL, a TV over IP (TVIP), a broadband TV (BTV), etc., and may further include an Internet TV, and a full-browsing TV available for Internet access.

A digital signal output from the signal input/output unit 130 also may include a stream signal (TS). As described earlier, the stream signal TS may be a signal obtained by multiplexing a video signal, an audio signal, and a data signal.

The interface unit 140 may deliver a signal input by the user to the controller 150 or may deliver a signal from the controller 150 to the user.

The interface unit 140 may deliver an input signal that is input by the user via a power key, a channel key, a volume key, a set-up key, etc., to the controller 150. Also, the interface unit 140 may include a sensor unit for sensing a user's gesture, a user's location, a user's touch, etc. In this regard, the sensor unit may include a touch sensor, a voice sensor, a location sensor, an operation sensor, a gyro sensor, etc. In this instance, the interface unit 140 may deliver an input signal from the sensor unit to the controller 150 or may transmit a signal from the controller 150 to the sensor unit.

The interface unit 140 may receive an input signal that is input by the user to control power, to select a channel, to configure a screen, etc., from the external input device 200, which may be, for example, a spatial remote controller. Also, the interface unit 140 may transmit a signal processed by the controller 160 to the external input device 200. In this case, the interface unit 140 and the external input device 200 may be connected in a wired configuration or wirelessly.

Also, the interface unit 140 may receive personal information from the external input device and/or receive information regarding an accessed Web server through such personal information. For example, when a mobile terminal is accessed within a predetermined distance from the external input device 200 to perform near-field communication, the external input device 200 may receive personal information stored in the mobile terminal, etc. Here, the personal information may be information required for accessing an electronic device or logging into a predetermined account to use a service.

The controller 150 controls a general operation of the image display apparatus 100. In more detail, the controller 150 may demultiplex a stream signal TS received through the tuner 110, the demodulation unit 120, and/or the signal input/output unit 130 or process demultiplexed signals to generate and output a signal for outputting video and audio. For example, the controller 150 may control the tuner 110 to tune to an RF broadcast signal corresponding to a channel selected by the user or a previously stored channel.

A video signal processed by the controller 150 may be delivered to the display unit 170 to output an image (or a video) corresponding to the video signal, and the audio signal processed by the controller 150 may be delivered to the audio output unit 180 to output a sound. Also, the video signal and/or audio signal processed by the controller 150 may be input to an output device of an external device.

In order to demultiplex a stream signal TS or process demultiplexed signals to generate and output a signal for outputting video or audio, the controller 150 may include a demultiplexing unit, a video processing unit, an on-screen display (OSD) generating unit, an audio processing unit, a data processing unit, a channel browsing processing unit, etc.

The demultiplexing unit (not illustrated) demultiplexes an input stream signal TS. For example, when an MPEG-2 stream signal TS is input, the demultiplexing unit demultiplexes the input MPEG-2 stream signal TS to separate it into a video signal, an audio signal, and a data signal. As described earlier, the stream signal TS may be output from the tuner 110, the demodulation unit 120, and/or the signal input/output unit 130.

The video processing unit (not illustrated) may process the demultiplexed video signal, e.g., perform decoding on the demultiplexed video signal. In more detail, the video processing unit may decode a coded video signal of the MPEG-2 standard by using an MPEG-2 decoder, and decode a coded video signal of the H.264 standard according to a digital multimedia broadcasting scheme, a digital multimedia broadcasting (DMB) or a DVB-H scheme by using an H.264 decoder. Also, the video processing unit may process the video signal to adjust brightness, tint, color, etc., of an image. The video signal processed by the video processing unit may be delivered to the display unit 170 or may be delivered to an external output device through an external output terminal (not illustrated).

The OSD generating unit (not illustrated) may generate an OSD signal either according (e.g., in response) to a user input or autonomously. In more detail, for example, on the basis of at least a video signal or a data signal or an input signal received from the external input device 200, the OSD generating unit may generate a signal for displaying various types of information such as graphics or text on the screen of the display unit 170. The generated OSD signal may include various types of data such as user interface screens, various menu screens, widgets, icons of the image display apparatus 100, a pointer corresponding to a pointing signal transmitted from the external input device 200, etc. Also, the generated OSD signal may include a two-dimensional (2D) object or a 3D object.

The controller 150 may mix the OSD signal generated by the OSD generating unit and the decoded video signal processed by the video processing unit. The mixed video signal may be changed to a frame rate of an image through a frame rate converter (FRC). Also, the mixed video signal may go through a formatter to change a format thereof so as to be output. Or, a 2D video signal and a 3D video signal may be separated or a 2D video signal may be converted into a 3D video signal, to display a 3D image.

The audio processing unit (not illustrated) may process the demultiplexed audio signal. For example, the audio processing unit may perform decoding on the demultiplexed audio signal. In more detail, the audio processing unit may decode the coded audio signal of the MPEG-2 standard by using an MPEG 2 decoder, may decode the coded audio signal of an MPEG 4 bit sliced arithmetic coding (BSAC) according to a DMB scheme by using an MPEG 4 decoder, and may decode the coded audio signal of the advanced audio codec (AAC) standard of MPEG 2 according to a satellite DMB scheme or a digital video broadcast-handheld (DVB-H) scheme. Also, the audio processing unit may process base, treble, volume control, etc. The audio signal processed by the audio processing unit may be delivered to an audio output unit 180, e.g., a speaker, or may be delivered to an external output device.

The data processing unit of the controller 150 may process the demultiplexed data signal. For example, the data processing unit may perform decoding on the demultiplexed data signal. Here, the data signal may include electronic program guide (EPG) information including broadcast information such as a start time, an end time, etc., of a broadcast program aired in each channel. In an ATSC scheme, the EPG information may include ATSC-program and system information protocol (ATSC-PSIP) information, and, in a DVB scheme, the EPG information may include DVB-service information (SI). Here, the ATSC-PSIP information or the DVB-SI information may be included in a header (4 byte) of an MPEG-2 TS.

The channel browsing processing unit (not illustrated) may receive the stream signal TS output from demodulation unit 120 or the stream signal TS output from the signal input/output unit 130, and extract an image therefrom to generate a thumbnail image. The generated thumbnail image may be input as-is to the controller 150 or may be coded and input to the controller 150. In such a case, by using the input thumbnail image, the controller 150 may display a thumbnail list including a plurality of thumbnail images on the display unit 170. Here, the thumbnail images of the thumbnail list may be displayed in the entire region of the display unit 170 or may be displayed in a partial region of the display unit 170 in a simple view manner. Also, the thumbnail images of the thumbnail list may be updated sequentially.

The controller 150 may process an analog baseband video/audio signal (CVBS/SIF). For example, the analog baseband video/audio signal (CVBS/SIF) input to the controller 150 may be an analog baseband video/audio signal output from the tuner 110 or the signal input/output unit 130. The controller 150 may process the input analog baseband video/audio signal (CVBS/SIF) and control the display unit 170 to display the processed video signal and control the audio output unit 180 to output the processed audio signal.

Also, the controller 150 may control an operation of the image display apparatus 100 according to a user command that is input through the signal input/output unit 130 or the interface unit 140, an internal program, etc. In more detail, on the basis of device information regarding an adjacent external device located around the image display apparatus 100, information regarding a remotely controllable channel, frequency information, code information of a different external device, etc., which is received from the signal input/output unit 130 or the interface unit 140, the controller 150 determines whether each external device, etc., has been connected according to personal information from the external input device 200. Accordingly, the controller 150 controls the display unit 170 to display an object indicating that each external device has been connected.

Also, the controller 150 may display at least one object as a 3D object on the display unit 170. Here, the object may be at least an accessed Web screen (e.g., newspaper, magazine, etc.), an electronic program guide (EPG), a menu, a widget, an icon, a still image, a video, or text.

Also, the controller 150 may sense a user gesture according to an image captured by an image capturing unit (not illustrated), a signal sensed by a sensing unit, or an input signal transmitted from the external input device 200, either separately or in combination.

Also, the controller 150 may recognize a user location on the basis of an image captured by the image capturing unit. For example, the controller 150 may recognize a distance (e.g., a z-axis coordinate) between the user and the image display apparatus 100, and, additionally, the controller 150 may recognize an x-axis coordinate and a y-axis coordinate in the display unit 170 corresponding to the user location.

The storage unit 160 may store a program for signal processing and controlling of the controller 150, store a processed video signal, audio signal, and data signal, or store information regarding a predetermined broadcast channel through a channel memory function such as a channel map, etc. The storage unit 160 may include at least one of a flash memory, a hard disk type memory, a multimedia card micro type memory, a card type memory (e.g., an SD or XD memory), a random access memory (RAM), a static RAM (SRAM), a read-only memory (ROM), an electrically erasable programmable ROM (EEPROM), a programmable ROM (PROM), a magnetic memory, a magnetic disk, or an optical disk.

Also, the storage unit 160 may store IR format key codes for controlling different external devices, or may store IR format key databases of a plurality of external devices.

The display unit 170 converts a video signal, a data signal, or an OSD signal processed by the controller 150, or a video signal, a data signal, a control signal, etc. received from the signal input/output unit 130 or the interface unit 140 into an RGB signal to generate a driving signal, and outputs an image on the basis of the RGB signal. The display unit 170 may be implemented in various forms such as a plasma display panel (PDP), a liquid crystal display (LCD), a thin film transistor-LCD (TFT-LCD), an organic light emitting diode (OLED) display, a flexible display, a three-dimensional (3D) display, an e-ink display, etc.

For example, when the display unit 170 is a 3D display, the display unit 170 may be implemented according to an additional display scheme or a single display scheme for 3D viewing. According to the single display scheme, the display unit 170 alone may implement a 3D image without requiring an additional display scheme, for example, glasses. The single display scheme may include a lenticular scheme, a parallax barrier scheme, etc. Also, according to the additional display scheme, the display unit 170 may implement a 3D image by using a 3D viewing device. For example, the additional display scheme may include a head mount display (HND) scheme, a glasses scheme, etc.

Also, in an embodiment in which the display unit 170 is implemented as a touch screen equipped with a touch sensor, the display unit 170 may serve as an input device as well as an output device.

The touch sensor may be configured to convert pressure applied to a particular portion of the display unit 170 or a change in the capacitance (or similar characteristic) generated at a particular portion of the display unit 151 to an electrical input signal. The touch sensor may be configured to detect the pressure when a touch is applied, as well as the touched position and area of a touch object. Here, the touch object may include a finger, a touch pen, a stylus pen, a pointer, etc. When there is a touch input with respect to the touch sensor, a corresponding signal (or signals) is transmitted to a touch controller. The touch controller processes the signals and transmits corresponding data to the controller 150. Accordingly, the controller 150 may recognize which portion of the display unit 151 has been touched.

The audio output unit 180 may receive an audio signal, for example, a stereo signal or a 5.1-channel signal, processed by the controller 150, and output (or reproduce) a corresponding sound. The audio output unit 180 may be implemented as any of various types of speakers.

The microphone 190 may receive a predetermined voice command from the user. The microphone 190 may also include various noise removal algorithms for removing noise generated during an input of an external sound signal. A user's voice command or external sound input through the microphone 190 may be transferred to the controller 150. The controller 180 may then process the input voice command or sound so as to recognize a corresponding meaning or function.

Although not illustrated, a camera (not illustrated) may capture an outside or a user, and generally one camera may be provided or two or more cameras may be provided according to use environments. Image information captured through the camera may be input to the controller 150. The controller 180 may process the input image information to sense a location or operation of the user or a specific object.

Also, the image display apparatus 100 may include a video communication unit (not illustrated) including the camera (not illustrated) and the microphone 190. The controller 150 may process image information captured by the camera and audio information collected by the microphone 190 and transmit the same to a video communication device of a counterpart device through the signal input/output unit 130 or the interface unit 140.

A power supply unit (not illustrated) supplies power to the image display apparatus 100. In particular, the power supply unit may supply power to the controller 150 that may be implemented in the form of a system on chip (SOC), the display unit 170 for displaying an image, and the audio output unit 180 for outputting a sound.

In this regard, the power supply unit may include a converter for converting alternating current (AC) power into direct current (DC) power. In an embodiment in which the display unit 170 is implemented as a liquid crystal panel having a plurality of backlight lamps, the power supply unit may further include an inverter that may be able to perform a pulse width modulation (PWM) operation for the purpose of varying luminance or dimming driving.

The external input device 200 may be connected to the interface unit 140 in a wired manner or wirelessly, and may transmit an input signal generated according to a user input to the interface unit 140. The external input device 200 may include a remote controller (for example, a spatial remote controller), a mouse, a keyboard, a wheel, etc. The remote controller may transmit an input signal to the interface unit 140 through Bluetooth, RF communication, infrared communication (IR communication), ultra-wideband (UWB), ZigBee, etc. In particular, when the external input device 200 is implemented as a spatial remote controller, it may sense an operation of a body of the spatial remote controller and generate an input signal.

The image display apparatus 100 may be implemented as a fixed digital broadcast receiver or a mobile digital broadcast receiver.

When the image display apparatus 100 is implemented as the fixed digital broadcast receiver, the image display apparatus 100 may receive at least one of ATSC (8-VSB) broadcast programs using a signal carrier, terrestrial DVB-T (COFDM) broadcast programs using a plurality of carriers, and ISDB-T (BST-OFDM) broadcast programs allowing for using different broadcast channels according to user authority, etc.

When the image display apparatus 100 is implemented as the mobile digital broadcast receiver, the image display apparatus 100 may receive at least one of terrestrial DMB broadcast programs, satellite DMB broadcast programs, ATSC-M/H broadcast programs, DVB-H (COFDM) broadcast programs, and Media Forward Link Only (MediaFLO) broadcast programs.

Alternatively, the image display apparatus 100 may ay be implemented as a digital broadcast receiver for cable, satellite communication, and an IPTV.

Also, features of the image display apparatus 100, as described with reference to various embodiments, may also be applied to a mobile terminal. The mobile terminal may include a mobile phone, a smart phone, a notebook computer, a digital broadcast receiver, a personal digital assistant (PDA), a portable multimedia player (PMP), a navigation device, a slate PC, a tablet PC, an ultra-book, etc.

In an embodiment in which the image display apparatus is used as a mobile terminal, a wireless communication unit may be further provided in addition to components described earlier. The wireless communication unit allows wireless communication between the mobile terminal and a wireless communication system or between the mobile terminal and a network in which the mobile terminal is located.

In this regard, the wireless communication unit may include at least one of a broadcast receiving module, a mobile communication module, a wireless Internet module, a short-range communication module, or a location information module.

The broadcast receiving module may receive broadcast signals and/or broadcast associated information from a broadcast management server via a broadcast channel.

Here, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, etc. Also, the broadcast signal may further include a broadcast signal combined with a TV or radio broadcast signal.

Here, the broadcast associated information may refer to information associated with a broadcast channel, a broadcast program or a broadcast service provider. The broadcast associated information may also be provided via a mobile communication network. Also, the broadcast associated information may exist in various forms. For example, it may exist in the form of an electronic program guide (EPG) of digital multimedia broadcasting (DMB), an electronic service guide (ESG) of digital video broadcast-handheld (DVB-H), etc.

The broadcast receiving module 111 may be configured to receive digital broadcast signals by using a digital broadcast system such as multimedia broadcasting-terrestrial (DMB-T), digital multimedia broadcasting-satellite (DMB-S), media forward link only (MediaFLO®), digital video broadcast-handheld (DVB-H), DVB-convergence of broadcasting and mobile service (CBMS), open mobile alliance-broadcast (OMA-BCAST), China multimedia mobile broadcasting (CMMB), mobile broadcasting business management system (MBBMS), integrated services digital broadcast-terrestrial (ISDB-T), etc. The broadcast receiving module may be configured to be suitable for any other broadcast system that provides a broadcast signal, as well as the above-mentioned digital broadcast systems.

Broadcast signals and/or broadcast-associated information received via the broadcast receiving module may be stored in a memory.

The mobile communication module transmits and/or receives radio signals to and/or from at least a base station, an external terminal, or a server in a mobile communication network. Such radio signals may include an audio call signal, a video call signal or various types of data according to text and/or multimedia message transmission and/or reception.

The mobile communication module implements a video call mode and an audio call mode. The video call mode refers to a state in which a user performs call communication while viewing an image of a counterpart, and the audio call mode refers to a state in which the user performs call communication without viewing an image of a counterpart. In order to implement the video call mode and an audio call mode, the mobile communication module is formed to transmit and receive at least a sound or an image.

The wireless Internet module supports wireless Internet access for the mobile terminal. This module may be internally or externally coupled to the terminal. The wireless Internet access technique implemented may include a WLAN (Wireless LAN), (Wi-Fi) direct, digital living network alliance (DLNA), Wibro (Wireless broadband), Wimax (World Interoperability for Microwave Access), HSDPA (High Speed Downlink Packet Access), GSM, CDMA, WCDMA, LTE (Long Term Evolution), etc.

The short-range communication module is a module for supporting short range communications. As the short-range communication technology, Bluetooth™, Radio Frequency IDentification (RFID), Infrared Data Association (IrDA), Ultra-WideBand (UWB), ZigBee™, Wi-Fi direct, etc., may be used.

The location information module is a module for checking or acquiring a location of the mobile terminal. A typical example of the location information module is a GPS (Global Positioning System) or a WiFi (Wireless Fidelity) module.

Figure 2:
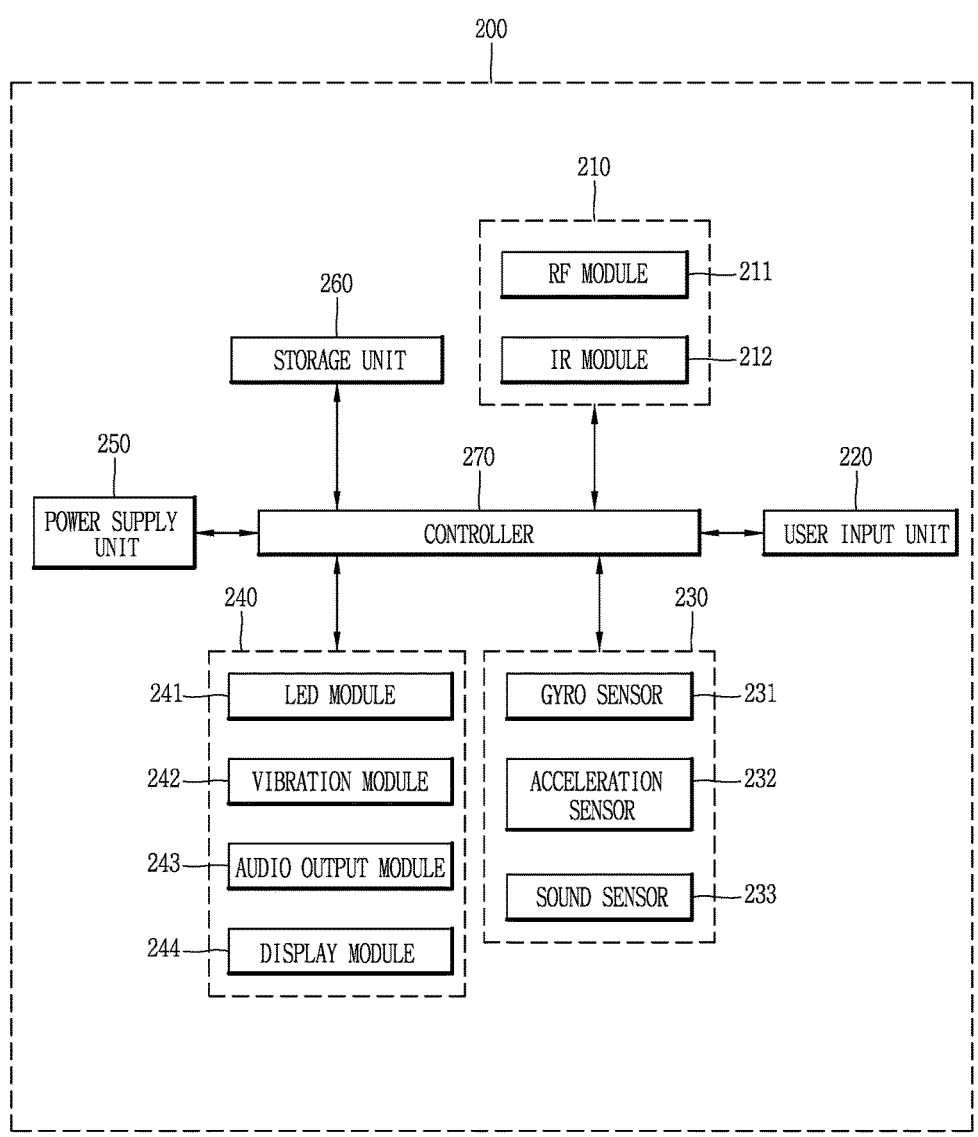
FIG. 2 is a block diagram illustrating the external input device of FIG. 1 in detail.

FIG. 2 is a block diagram of an external input device 200 according to one embodiment. The external input device 200 may include a wireless communication unit 210, a user input unit 220, a sensing unit 230, an output unit 240, a power supply unit 250, a storage unit 260, and a controller 270.

With reference to FIG. 2, the wireless communication unit 210 may transmit a signal to the image display apparatus 100 or may receive a signal from the image display apparatus 100. In this regard, the wireless communication unit 210 may include an RF module 211 and an IR module 212. The RF module 211 is connected to the interface unit 140 of the image display apparatus 100 according to an RF communication standard to transmit and receive a signal, and the IR module 212 is connected to the interface unit 140 of the image display apparatus 100 according to an IR communication standard to transmit and receive a signal. For example, the wireless communication unit 210 may transmit a signal including information regarding a movement of the external input device 200, etc., to the image display apparatus 100 through the RF module 211.

The external input device 200 may further include an NFC module for near-field communication with an external device. Through near field communication with a predetermined external device, the external input device 200 may receive personal information, information regarding a Web server connected through the personal information, etc., and transmit the received information to the image display apparatus 100 through the RF module 211 or the IR module 212.

Additionally, the external input device 200 may transmit a signal to the interface unit 140 of the image display apparatus 100 by using Bluetooth, IR communication, UWB, ZigBee, NFC, etc.

The external input device 200 may receive a video, audio, or data signal, etc., output from the interface unit 140 of the image display apparatus 100. On the basis of the received video, audio, or data signal, the external input device 200 may display an image or output a sound.

Also, the external input device 200 may receive device information of a different external device, remotely controllable channel information, frequency information, or code information of a different external device, etc., from an adjacent external device therearound, and may allocate a channel, frequency, or code to the corresponding external device on the different external device information to perform remote controlling.

The user input unit 220 may include a keypad, a key button, a touch screen, a scroll key, a jog key, etc., to facilitate entering of an input. The user may input a control command in relation to the image display apparatus 100 by manipulating the user input unit 220. Such a control command may be input by the user through a push operation of a hard key button of the user input unit 200. Also, in an embodiment in which the user input unit 220 includes a touch screen, such a command may be input by touching a soft key of the touch screen by the user.

The user input unit 220 may include, for example, an OK key, a menu key, a four-direction key, a channel control key, a volume control key, a back key, a home key, etc. The OK key may be used to select a menu or an item, and the menu key may be used to display a predetermined menu. Also, the four-direction key may be used to move a pointer or an indicator displayed on the display unit 170 of the image display apparatus 100 up/down or left/right. Also, the channel control key may be used to control a channel up and down, and the volume control key may be used to control volume up and down. Also, the back key may be used to move a current screen to a previous screen, and the home key may be used to move a current screen to a home screen.

The OK key may be implemented by adding a scroll function (or capability). In this regard, the OK key may be implemented in the form of a wheel key. Namely, when the user pushes the OK key up/down or left/right, a corresponding menu or item may be selected, and when the user rotates the provided wheel up and down, a screen output to the display unit 170 of the image display apparatus 100 may be scrolled or changed to a next list page according to a direction corresponding to the rotation of the wheel. For example, in a situation in which only a portion of the entire screen to be output to the display unit 170 is displayed, the user may scroll the wheel of the OK key to search (or locate) a desired portion of the screen, and a screen region which had not been output to the display unit 170 may be output to the display unit 170. In another example, in a situation in which a list page is displayed on the display unit 170, the user may scroll the wheel of the OK key to display a previous page or a next page of a current page displayed on the display unit 170.

Also, by using the scroll function of the OK key, a channel up or down to correspond to a rotation of a wheel may be controlled during broadcast channel switching, and sounds may be output by turning volume up or down to correspond to a rotation of a wheel.

Also, the scroll function of the OK key may be implemented as a separate key.

The sensing unit 230 may include a gyro sensor 231, an accelerometer 232 and a sound sensor 233. The gyro sensor 231 may sense a spatial movement of the external input device 200 on the basis of an x axis, a y axis, and a z axis. The accelerometer 232 may sense a movement speed, etc., of the external input device 200. The sound sensor 233 may sense voice information input to the external input device 200, and transfer it to the controller 150 or the image display apparatus 100. The controller 150 or the image display apparatus 100 may recognize a voice corresponding to the voice information and/or recognize the recognized voice as a control command for controlling the operation of the image display apparatus 100.

Also, the sensing unit 230 may further include a distance measurement sensor, and a distance to the display unit 170 may be sensed by using the distance measurement sensor.

The output unit 240 may output information corresponding to manipulation of the user input unit 220 and information corresponding to a transmission signal of the image display apparatus 100. Thus, the user may recognize a manipulation state of the user input unit 220 or a control state of the image display apparatus 100 through the output unit 240. The output unit 240 may include an LED module 241, a vibration module 242, an audio output module 243, and a display module 244. In response to a manipulation of the user input unit 220 or a signal transmitted and received through the wireless communication unit 210, the LED module 241 may be turned on, the vibration module 242 may generate vibrations, and the display module 244 may output an image.

The power supply unit 250 may supply power to various components (including electronic elements) of the external input device 200. When the external input device 200 does not move (or is not operated) for a predetermined period of time, the power supply unit 250 may stop power supply to reduce power consumption. When a predetermined key of the external input device 200 is manipulated, the power supply unit 250 may resume power supply.

The storage unit 260 may store various programs, applications, frequency band information, etc., in relation to controlling or operation of the external input device 200. Also, the storage unit 260 may store IR format key codes for controlling different external devices by an IR signal, and may store IR format key databases of a plurality of external devices.

The controller 270 may perform a general controlling operation of the external input device 200. The controller 270 may transmit a signal corresponding to a predetermined key manipulation of the user input unit 220 to the image display apparatus 100 through the wireless communication unit 210. Also, the controller 270 may transmit a signal corresponding to a movement of the external input device 200 sensed by the sensing unit 230 to the image display apparatus 100 through the wireless communication unit 210, and the image display apparatus 100 may calculate coordinate values of a pointer corresponding to the movement of the external input device 200.

Figure 3:
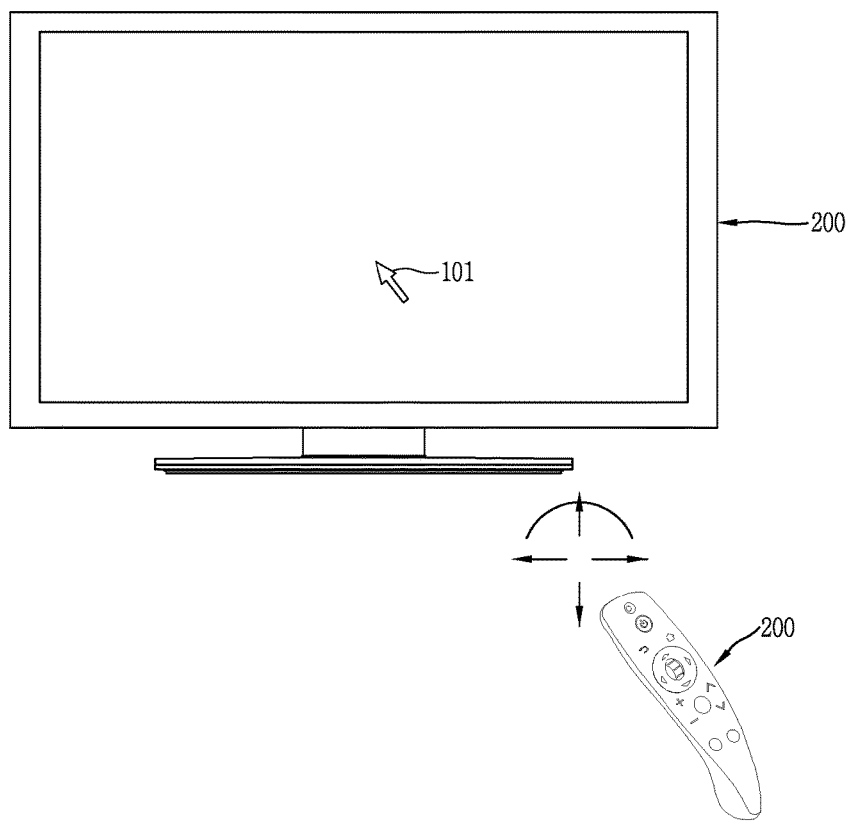
FIG. 3 is a conceptual view illustrating an interaction between the image output apparatus and an external input device in accordance with the present invention.

FIG. 3 illustrates an interaction between a image display apparatus 100 and an external input device 200 according to one embodiment. By way of example, the image display apparatus 100 is illustrated as a TV receiver, and the external input device 200 is illustrated as a spatial remote controller.

With reference to FIG. 3, the external input device 200 may transmit or receive a signal to or from the image display apparatus 100 according to an RF communication standard. A control menu may be displayed on a screen of the image display apparatus 100 according to a control signal from the external input device 200. In this regard, the external input device 200 may include a plurality of buttons, and may generate an external input signal according to a user's manipulation (or operation) of the buttons. Also, the external input device 200 may transmit information regarding a movement in a 3D space of the external input device 200 to the image display apparatus 100. The information may be sensed by the sensing unit.

With reference to FIG. 3, when the user moves or rotates the external input device 200 up/down, left/right, forward/backward, a pointer 101 corresponding to the movement of the external input device 200 may be displayed on the screen of the image display apparatus 100. Since the displayed corresponding pointer 101 moves on the screen of the image display apparatus 100 according to the movement of the external input device 200 in the 3D space, the external input device 200 may be called a spatial remote controller.

The information regarding the movement of the external input device 200 sensed by the sensing unit of the external input device 200 is transmitted to the image display apparatus 100. Then, the image display apparatus 100 may calculate X and Y coordinates of the corresponding pointer from the information regarding the movement of the external input device 200. The image display apparatus 100 may display the pointer 101 corresponding to the calculated coordinates.

During a state in which a particular button provided in the external input device 200 is pressed, when the user moves the external input device 200 to be away (or further) from the screen of the image display apparatus 100, a selected region of the screen corresponding to the displayed pointer 101 may be zoomed in (or zoomed out) so as to be magnified (or reduced). Conversely, when the user moves the external input device 200 to be closer to the screen of the image display apparatus 100, a selected region of the screen corresponding to the displayed pointer 101 may be zoomed out (or zoomed in) so as to be reduced (or magnified).

During a state in which a particular button provided in the external input device 200 is pressed, recognition of a vertical (up/down) or horizontal (left/right) movement of the external input device 200 may be paralyzed (or disabled). Namely, in this situation, when the external input device 200 is moved to be further away from or closer to the screen of the image display apparatus 100, an up/down/left/right movement may not be recognized, and only a forward/backward movement may be recognized.

Also, a movement speed and a movement direction of the displayed pointer 101 and a speed of scrolling the screen according to a movement of the pointer 101 may be determined according to a movement speed and/or a movement direction of the external input device 200. As described earlier, the pointer 101 may have the shape of an arrow (see FIG. 3). Alternatively, the pointer 101 may have any of various other shapes. For example, the pointer 101 may have a shape of a dot, a cursor, a prompt, an outline, etc.

An image display apparatus 100 according to an embodiment of the present invention including at least one of the aforementioned components may recognize user's voice command input through the microphone 190 while a pointer is output on a screen of the display unit 151. In this manner, when the voice command is input, the controller 150 may generate a representative image corresponding to the input voice command and attach the generated representative image to the pointer output on the screen. The attached representative image may move in response to the movement of the pointer.

Hereinafter, a typical pointer may be referred to as 'first pointer' and a pointer to which the representative image has been attached may be referred to as 'second pointer.'

Also, the representative image may be a concept including an image, text or combination thereof which allow the user to immediately recognize a function corresponding to a voice command input by the user in a visual manner. For example, when the input voice command is 'Delete,' the representative image may be an 'image of a waste basket.' Or, when the input voice is not a control command but a voice indicating an address such as '49-4, Nonhyun-dong, Gangnamgu, Secoul,' the representative image may be a part of an image that the corresponding voice has been converted into text, namely, 'Seoul.'

In a state that the pointer with the representative image attached thereto is output on the display unit 170, when a pointing signal is received from the external input device 200, a specific object output on the screen may be selected by the second pointer. When the specific object is selected, the controller 150 may immediately execute a function, for example, 'delete' corresponding to the representative image by targeting the specific object selected by the second pointer.

Accordingly, the user can recognize the function to be executed immediately after viewing the shape of the pointer, which may enable a feedback. Also, the user can select objects desiring to apply a corresponding function merely by using the pointer. This may result in providing a user environment enabling the same operation or function to be executed with respect to a plurality of objects in a faster and more intuitive manner.

Hereinafter, a method for operating an image display apparatus in accordance with an embodiment of the present invention will be described, with reference to FIGS. 4 and 5A to 5D. Here, the image display apparatus 100 is illustrated as a TV receiver and the external input device 200 is illustrated as a spatial remote controller.

Figure 4:
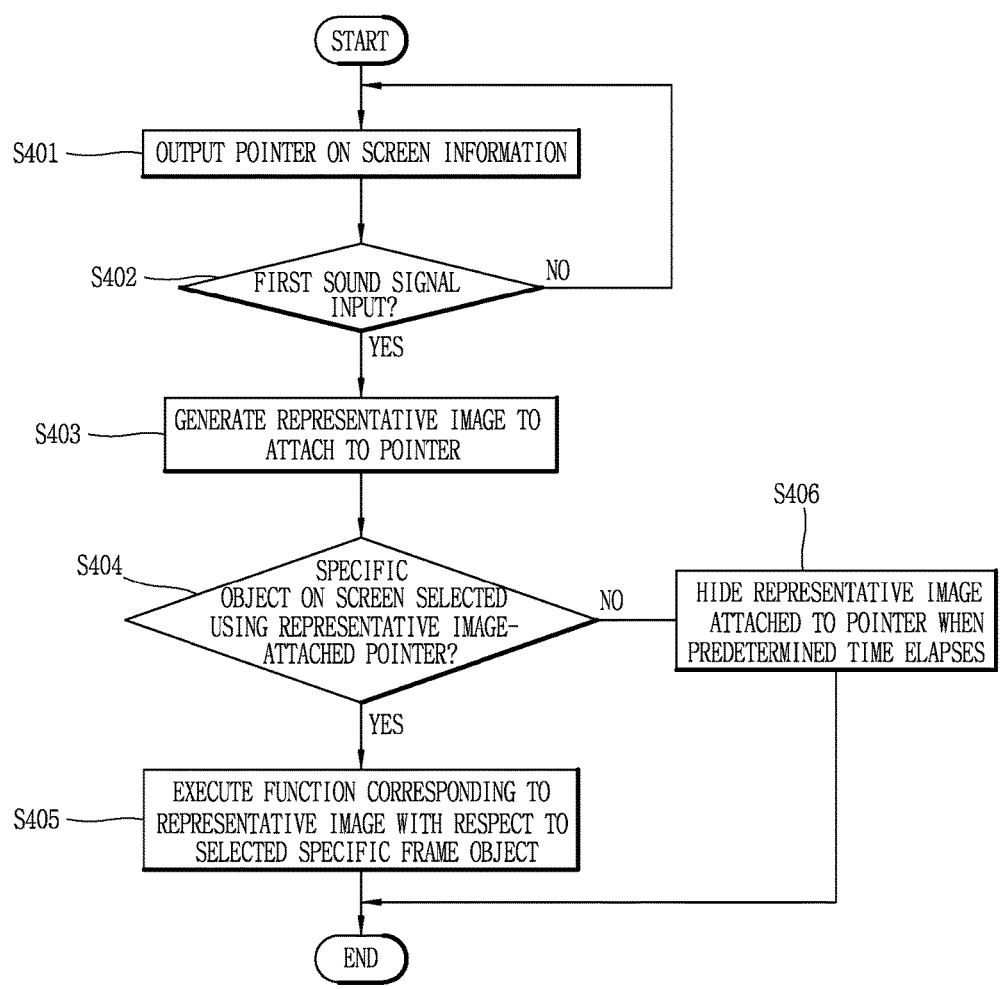
FIG. 4 is a flowchart illustrating sequential steps of a method of operating an image display apparatus in accordance with an embodiment of the present invention.

Referring to FIG. 4, the image display apparatus 100 (see FIG. 1) according to the embodiment of the present invention may output a first pointer, which is moved according to a pointing signal transmitted from the external input device 200, for example, the spatial remote controller, on a screen (S401).

Here, the first pointer may have any of various other shapes. For example, the first pointer may have a shape of a dot, a cursor, a prompt, an outline, etc. Also, the first pointer may normally not be output on a screen, and may be output on one region, for example, a central region of the screen of the display unit 170 when a movement of the spatial remote controller 200 is sensed.

Also, the first pointer output on the screen may disappear from the screen when any signal, for example, a pointing signal is not input for a preset period of time.

When the first pointer is output, the controller 150 may sense that a first voice signal is currently input by a user (S402). Here, the first voice signal may refer to a user voice which is input through the microphone 190 of the image display apparatus 100 or the sound sensor 233 provided in the spatial remote controller 200.

When the first voice signal is sensed in the step S402, the controller 150 may activate a voice recognition function. Also, in order to output the input voice signal into a text form, the controller 150 may activate a speech to text (STT) function along with the voice recognition function. The voice recognition algorithm and the STT algorithm may be stored in the storage unit 160.

The controller 150 may also activate the functions if a preset key input (e.g., a voice recognition activation button), a touch input, a voice signal, a gesture or the like is input by the user, even before the first voice signal is sensed. In this instance, the controller 150 may output indicators corresponding to the activated functions on one region of the display unit 170 (see FIG. 1).

When it is determined that the voice recognition function and the STT function have been activated, the controller 150 may generate a representative image corresponding to the input first voice signal, and attach the generated representative image to the first pointer (S403).

Here, the representative image may indicate an image that the first voice signal is converted into text or that can represent a function corresponding to a voice recognition result of the first voice signal. For example, when the first voice signal is recognized as a specific control command, such as 'Send it by email,' the controller 150 may generate 'an image of an envelope shape' as a representative image. Or, when the first voice signal is recognized as a voice, such as 'John,' other than a control command, the controller 150 may generate 'John' text as a representative image.

The representative image may be an image prestored in the storage unit 160, an image extracted from a predetermined webpage through a web access, or a part of a converted text using the STT function.

Also, attaching the representative image to the first pointer may refer to outputting the representative image along with the first pointer alongside (or close to) the first pointer, namely, refers to that the first pointer is output by being converted into the second pointer.

In more detail, the generated representative image may be attached to a top/bottom/left side/right side of the first pointer. In this instance, a detailed position where the representative image is attached may be preset by a user input or automatically changed in a manual manner through a user voice or according to a position of a pointer (e.g., the representative image is output at a visible position when the pointer is located at each edge of the screen).

In this instance, the representative image may be output in a form of a 2D or 3D object. Also, the representative image may be output in a hatched state or a semi-transparent state, so as to be visually distinguished from the first pointer.

Also, the representative image may be output in a manner that at least part thereof overlaps the first pointer, and at a predetermined distance apart from the first pointer. However, the representative image may preferably be output in a manner of overlapping the first pointer in a range of not obscuring a point directed by the first pointer and also being spaced apart from the first pointer in a range that the representative image is recognized as being attached to the first pointer.

Also, the controller 150 may generate a plurality of representative images corresponding to the first voice signal. In this instance, the controller 150 may control the generated plurality of representative images to be output alongside (or close to) the first pointer in an alternating manner. For example, when the first voice signal is 'Delete,' 'waste basket image' and 'delete' text may be generated as representative images. In this instance, 'waste basket image' and 'delete' text may be output alongside the first pointer with a preset time interval (e.g., 3 seconds) in an alternating manner.

Figure 5A:
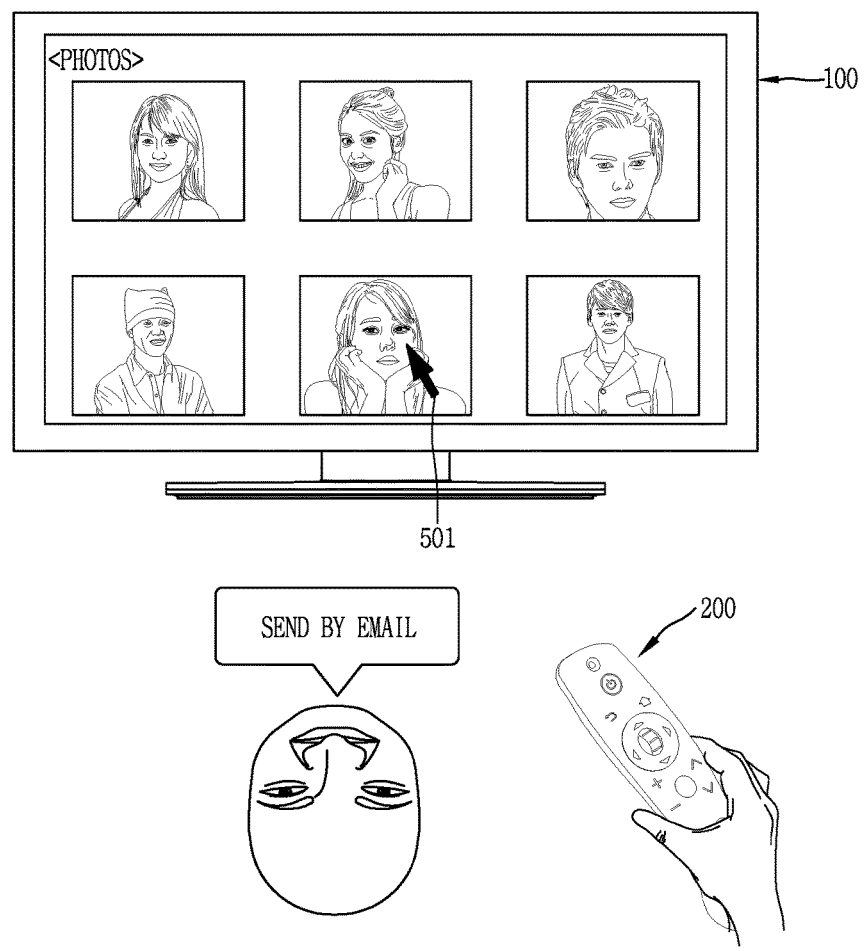
FIGS. 5A to 5D are conceptual views illustrating the flowchart of FIG. 4.
Figure 5B:
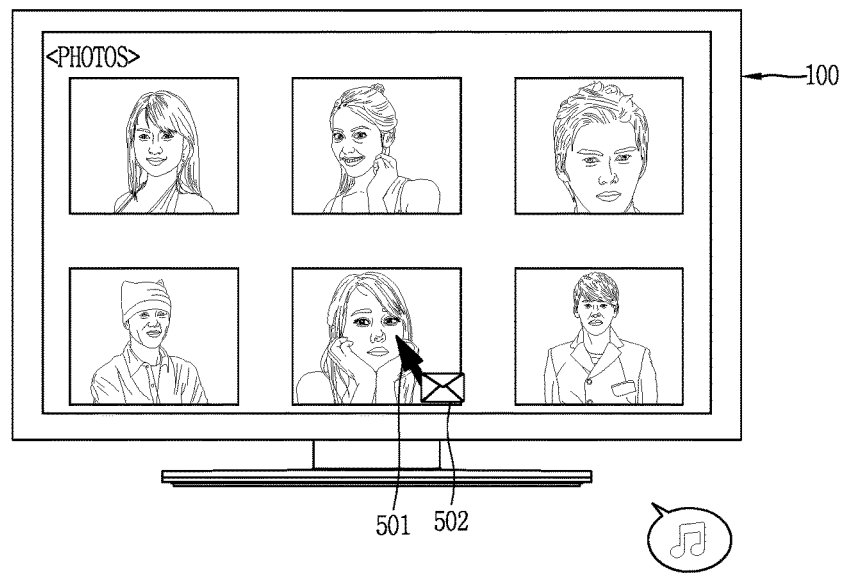

Referring to FIGS. 5A and 5B, while the pointer 501 is output on the display unit 170 of the image display apparatus 100 as illustrated in FIG. 5A, when the user inputs a voice command 'Send it by email,' as illustrated in FIG. 5B, a representative image, namely, an 'envelope' image 502, which corresponds to 'email sending function' included in the input voice command, may be generated and attached to the pointer 501. Also, when the 'envelope' image 502 is attached to the pointer 501, a predetermined alarm, for example, vibration, sound, popup message, etc., may be output.

In this manner, while the representative image is attached to the first pointer, the user can move the pointer with the representative image attached thereto, namely, the second pointer using the spatial remote controller 200. The controller 150 may sense that a specific object output on the screen has been selected by the second pointer (S404).

Here, the specific object, for example, may be at least one of a specific webpage (it may be allowed to designate a specific block within a webpage) output on the screen, an electronic program guide (EPG), various menus, a widget, an icon, a still image, a video, text and an input window.

Also, selecting the specific object by the second pointer may refer to moving the representative image-attached pointer, namely, the second pointer, to an output region of the specific object by moving the spatial remote controller 200 and then applying a preset select signal to the image display apparatus 100, namely, 'clicking' the moved output region.

In this instance, the preset select signal may be generated by one of a preset key input, a touch input, a voice command (e.g., 'Select') and a gesture. For example, when an input signal, which is generated in response to the user pushing a specific key (e.g., 'OK key' or 'hot key') provided on the spatial remote controller 200, is transmitted to the image display apparatus 100, the image display apparatus 100 may recognize that the select signal has been generated.

Figure 5C:
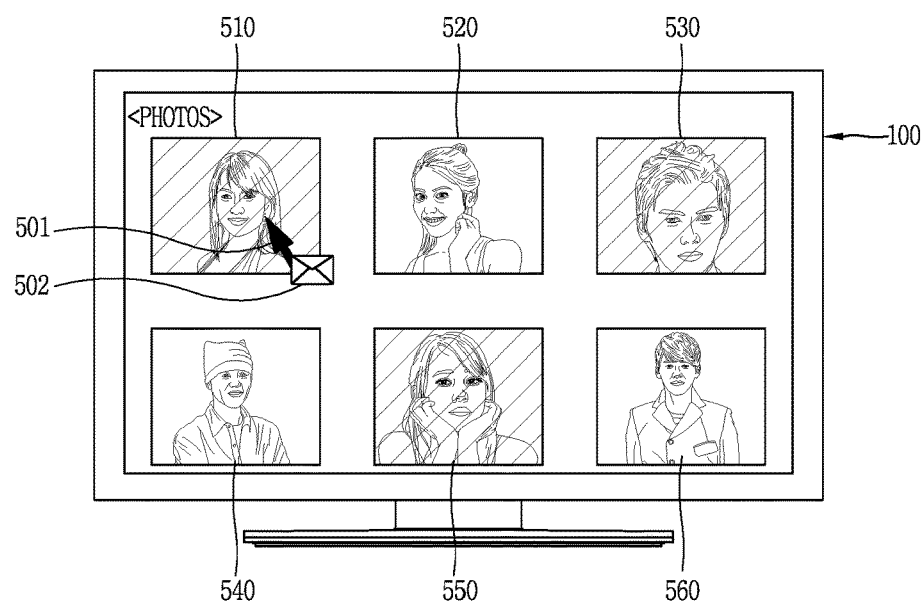

For example, as illustrated in FIG. 5C, the user may freely move the pointer 501 with the 'envelope' image 502 attached thereto using the spatial remote controller 200, and also select photos (or images) desiring to send by email using the pointer. Photos 510, 530 and 550 which have been selected by the pointer 501 may be output in a manner of being visually distinguished from non-selected photos 520, 540 and 560. In this instance, the 'envelope' image 502 may be moved in response to the movement of the pointer 501.

A type and number of an object selected by the second pointer may be one or in plurality. That is, even after the specific object has been selected by the second pointer, the representative image attached to the pointer may be continuously output. Accordingly, the controller 150 may select a first object using the second pointer, and then select a second object by moving the second pointer to another region.

Also, selectable objects may include even objects which are output on a screen, which is output in response to an execution of a specific application, as well as objects output on the current screen of the display unit 170. That is, there is no limit to a range of a region for selecting objects.

To this end, when an object selected by the second pointer is an execution icon of an application, the controller 150 may exceptionally recognize it as a selection by the first pointer without any representative image attached thereto.

In this manner, when a specific object output on the screen is selected by the representative image-attached pointer, the controller 150 may execute a function corresponding to the representative image by targeting the selected specific object (S405). That is, the controller 150 may apply the function corresponding to the representative image attached to the pointer to the selected specific object.

Here, the function corresponding to the representative image may be decided according to the voice recognition result of the first voice signal input in the step S402.

In detail, when the first voice signal is recognized as a control command, the controller 150 may execute (apply) the control command corresponding to the representative image with respect to the selected object. For example, when the first voice signal is 'Send by email,' as illustrated in FIG. 5C, the photos 510, 530 and 550 selected by the second pointer to which the 'envelope' image has been attached may immediately be transmitted by email.

On the other hand, when the first voice signal is recognized as a voice other than a control command, the controller 150 may control a full text corresponding to the representative image to be output on the selected object or a selected region. For example, when the first voice signal is 'John,'

John' text may be output on an input window selected by the second pointer with 'John' text (here, it is assumed that a conversion from a voice into text has been performed through the STT function), almost as soon as selecting, namely, 'clicking' the input window. When there are a plurality of input windows, the second pointer may be moved to another input window and the another input window may be clicked, which may allow for consecutive input.

For example, the controller 150 may recognize the representative image-attached second pointer as a specific function key. That is, the controller 150 may freely move the second pointer according to a pointing signal, and may control a function to be immediately 'executed' as soon as an object or region is 'selected' in a 'clicking' manner.

Figure 5D:
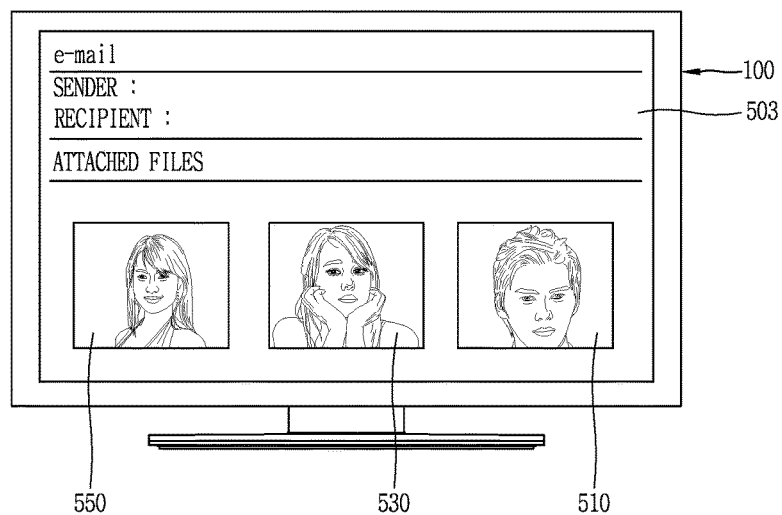

For example, referring to FIGS. 5C and 5D, when the user selects a plurality of photos 510, 530 and 550 desiring to send by email by moving the pointer 501, to which the 'envelope' image 502 has been attached, as illustrated with reference to FIG. 5C, the plurality of photos 510, 530 and 550 selected may immediately be transmitted by email. In this instance, a transmitting order by email may be decided according to a selected order. Also, in case where a recipient of an email has not been preset, as illustrated in FIG. 5D, an execution screen 503 of an email application in which the selected photos are attached as files to be sent may be output. On the other hand, when the selected photos are transmitted by email, respectively, transmission information, for example, a transmission rate, a transmission failure and the like may be output adjacent to the pointer 501.

Also, for example, when a function corresponding to the representative image is 'scheduled recording,' and specific program information is selected from an EPG output on a screen by the pointer, to which the 'scheduled recording' representative image has been attached, recording of the selected program may be scheduled (reserved).

On the other hand, when a predetermined time elapses without selection of a specific object by using the representative image-attached pointer in the step S404, the controller 150 may control the representative image attached to the pointer to temporarily disappear from the screen (hereinafter, referred to as 'hiding' the representative image) (S406).

As described above, in the image display apparatus according to the embodiment of the present invention, when a user voice command is input, an icon indicating a function corresponding to the input voice command may be attached to a pointer, which may allow the user to directly recognize which operation or function the user desires to execute from outside. Also, an environment, in which a function indicated by the icon can be executed immediately when a specific object or region is selected by the pointer as the icon attached to the pointer moves along the movement of the pointer, may be provided. This may provide user convenience specifically in case of having to repetitively executing (applying) the same function with respect to a plurality of objects.

Hereinafter, description will be given of an embodiment in which a different representative image is attached to a pointer according to a function corresponding to an input voice signal, in relation to the step S403.

Figure 6A:
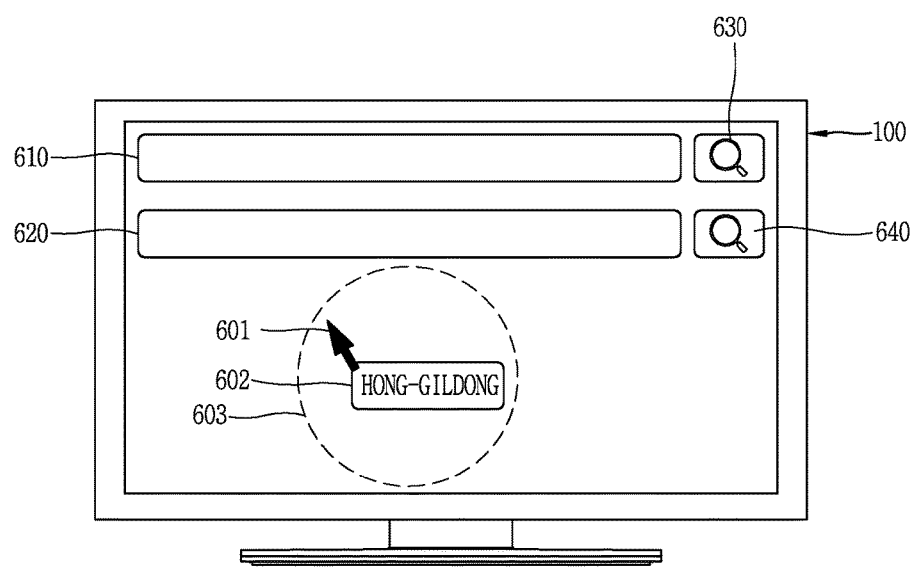
FIGS. 6A to 6C are conceptual views illustrating an example in which a different representative image is attached to a pointer according to a function corresponding to an input voice signal, in accordance with an embodiment of the present invention.
Figure 6A:
Figure 6B:
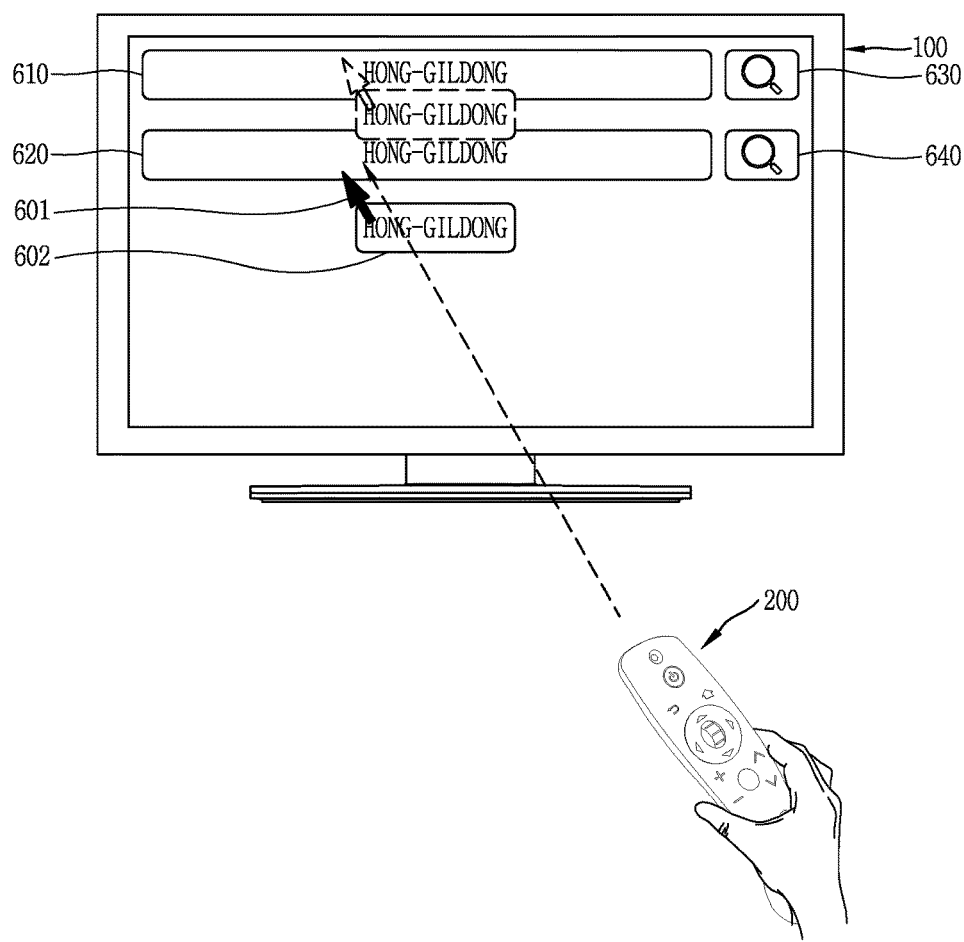
Figure 6C:
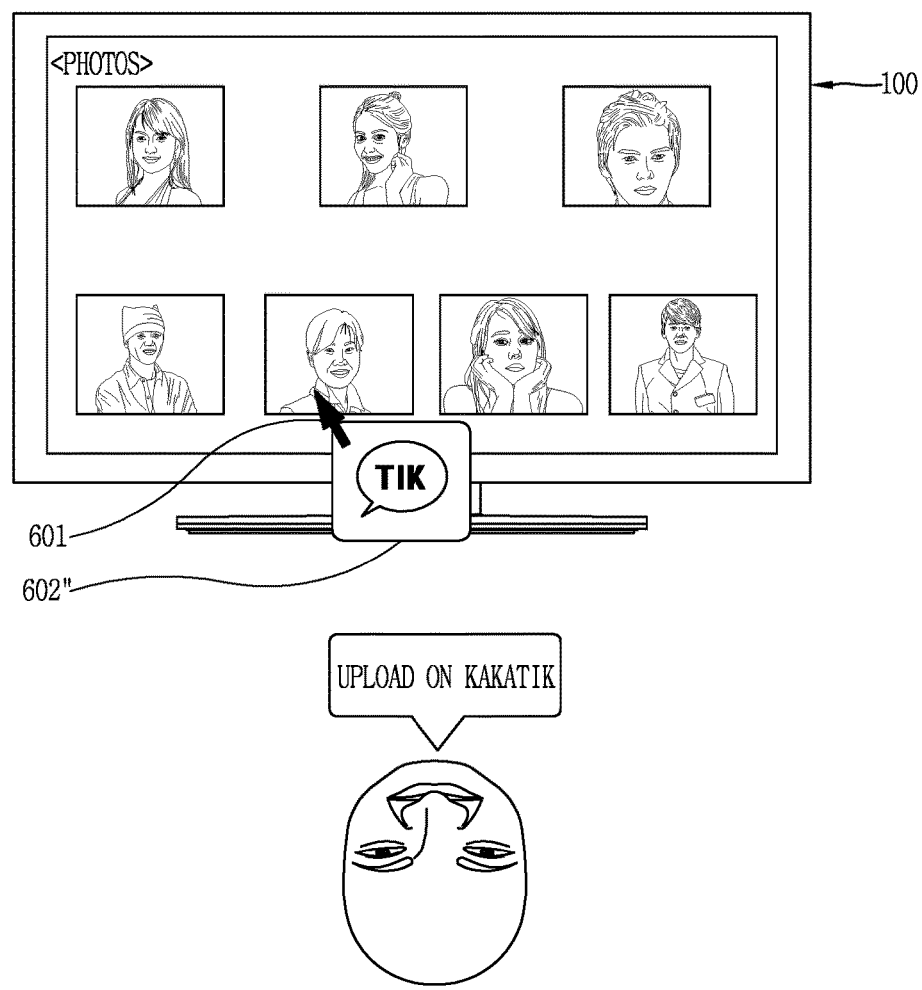

FIGS. 6A to 6C illustrate an example in which a different representative image is attached to a pointer according to a function corresponding to an input voice signal.

In one example, when an input voice signal is a control command, the controller 150 may attach a representative image indicating a function included in the voice signal. In this instance, the representative image may preferably be an image and/or text which the user can immediately recognize a corresponding function in a visual manner. Also, the representative image may include information indicating a service for performing the function. The representative image may also be changed by a user input, and in this instance, a function included in the representative image may be maintained even if the representative image is edited. Also, whether or not the input voice signal is a control command may be determined by monitoring whether or not a preset term or phrase is included in the voice signal (e.g., if 'send,' 'upload,' 'post,' 'transmit' or the like is included in the input voice signal, it is recognized that 'transmission function' is included).

For example, referring to FIG. 6C, when the user inputs a voice command 'Upload on Kakatik (SNS),' the controller 150 may recognize the user's voice, and generate a representative image 602" corresponding to a control command 'upload or transmit' on 'SNS called Kakatik,' and attach the generated representative image 602" to a pointer 601.

In another example, when the input voice signal is not recognized as a control command, the controller 150 may generate a text converted from the voice signal as a representative image. In this instance, the representative image may be generated by including part or all of the converted text. Also, size, font, color and the like of the representative image may be changed by a user input.

For example, as illustrated in FIGS. 6A and 6B, when the user inputs a voice 'Hong-gildong,' the controller 150 may generate 'Hong-gildong' that the input voice is converted into text by executing the STT function as a representative image. The controller 150 may recognize a state in which the generated 'Hong-gildong' text 602 is attached to the pointer 601 as a second pointer 610. When the user selects (clicks) input regions 610 and 620 with the pointer 601 using the spatial remote controller 200, the same 'Hong-gildong' text which is the same as the representative image 602 may be output on the input regions 610 and 620.

Hereinafter, description will be given of an embodiment in which a pointer and a representative image attached to the pointer are changed according to a movement of the spatial remote controller 200 while the representative image is attached to the pointer in the step S403, with reference to FIGS. 7A to 7C.

The controller 150 may output a preset animation effect or a predetermined notification sound when the representative image is attached to the pointer in the step S403. Here, the animation effect may be provided to attract user's interest, and the notification sound may be provided for the user to recognize that the function of the pointer has been added.

While the representative image is attached to the pointer, the user may move and manipulate the spatial remote controller 200 to generate a pointing signal. The generated pointing signal may be applied to the image display apparatus 100 through the interface unit 140, thereby moving and outputting the pointer to which the representative image has been attached.

The controller 150 of the image display apparatus 100 may then control the representative image to be moved in response to the pointer being moved based on the received pointing signal. In this instance, the controller 150 may output an effect that the representative image waves in the wind on the basis of a movement direction and a movement speed when the representative image is moved along the movement of the pointer.

Figure 7A:
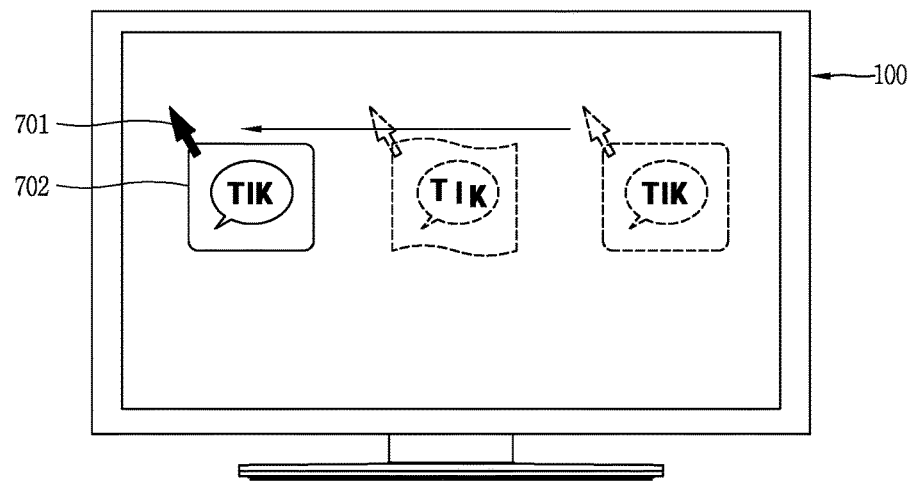
FIGS. 7A to 7C are conceptual views illustrating an example in which a pointer and a representative image attached to the pointer are changed according to a movement of an external input device, in accordance with an embodiment of the present invention.
Figure 7A:
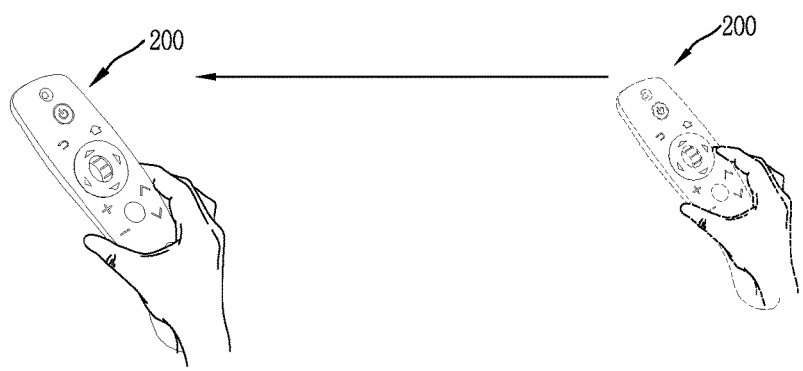

For example, referring to FIG. 7A, as the spatial remote controller 200 is moved from right to left, a pointer 701 to which a representative image 702 has been attached is moved from right to left. And, as the pointer 701 is moved, the attached representative image 702 may also be moved while outputting an effect that it waves in the wind. Meanwhile, the visual effect may variously change by a predetermined input.

On the other hand, when the movement of the pointer is not sensed for a preset period of time (e.g., 10 seconds) while the representative image is attached to the pointer, the controller 150 may hide the representative image attached to the pointer, and control the hidden representative image to appear again as the pointer is moved again. That is, when the pointer is continuously stopped, the representative image may temporarily disappear to prevent it from unnecessarily obscuring the screen.

Figure 7B:
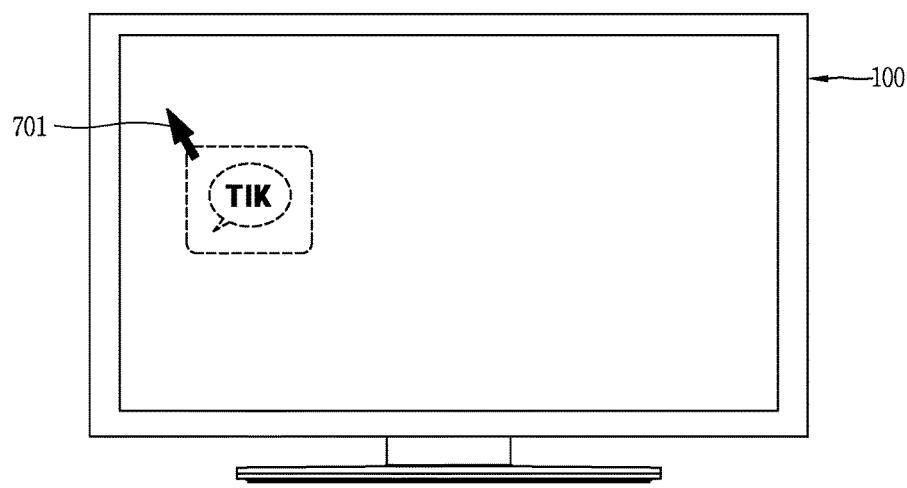
Figure 7B:
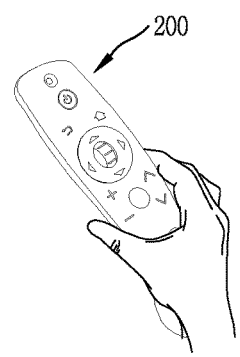
Figure 7C:
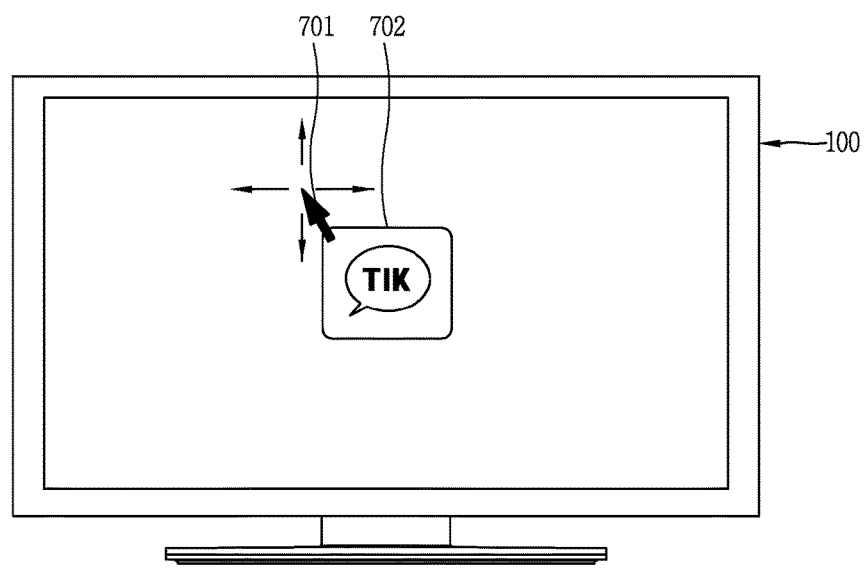
Figure 7C:
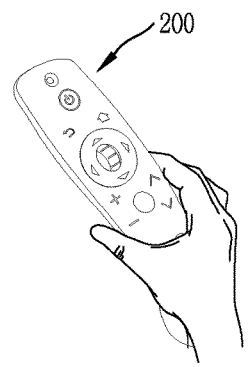

For example, referring to FIGS. 7B and 7C, when any pointing signal is not received from the spatial remote controller 200 for more than 10 seconds, the representative image may be hidden and only the pointer 701 may be output on the screen. When the pointer 701 is moved again in response to the movement of the spatial remote controller 200, the representative image 702 may be output again in the attached state to the pointer 701.

Figure 8:
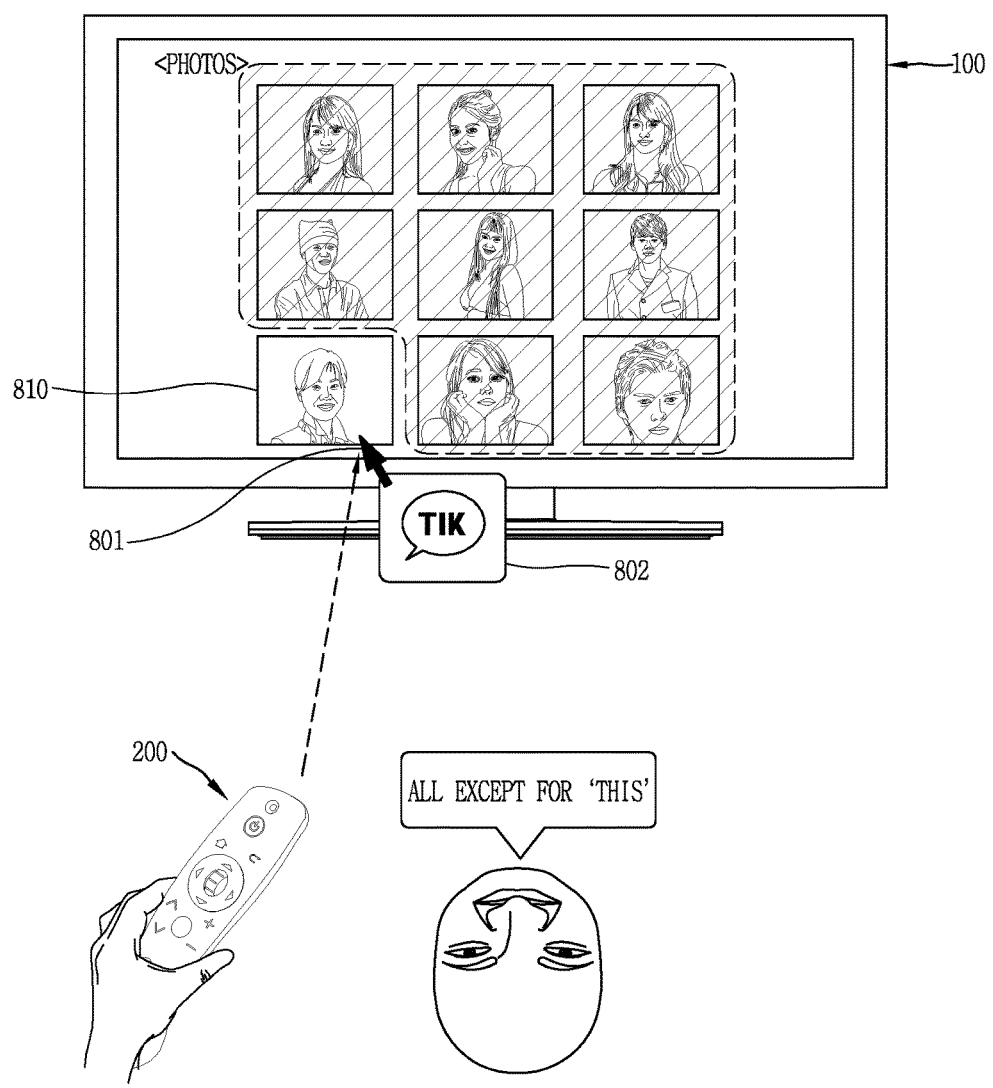
FIG. 8 is a conceptual view illustrating an example in which an object is selected by a pointer with a representative image attached thereto, based on an input voice signal, in accordance with an embodiment of the present invention.

FIG. 8 is a conceptual view illustrating another example in which an object is selected by a pointer to which a representative image has been attached in the step S404.

In a state where the pointer with the representative image attached thereto has been moved to a specific object or a specific region, a user input for generating 'select signal' may be applied in various manners. For example, the user input may be applied by a voice command such as 'select' or 'click,' a preset type of gesture, an input of a specific key of the spatial remote controller 200 and the like.

As another example, when a second voice signal is input through the microphone after the pointer with the representative image attached thereto is moved to a specific region of the screen, the controller 150 may select at least one object corresponding to the second voice signal based on the specific region.

For example, referring to FIG. 8, after moving a pointer 801 with a representative image attached thereto to an output region of a specific photo 810 using the spatial remote controller 200, when the user inputs a voice signal 'All except for this!,' all of prestored photos of a corresponding page except for the specific photo 810 may be transmitted or uploaded to 'Kakatik (TiK)' corresponding to the representative image. That is, this method may result in saving time required for many selections.

Figure 9A:
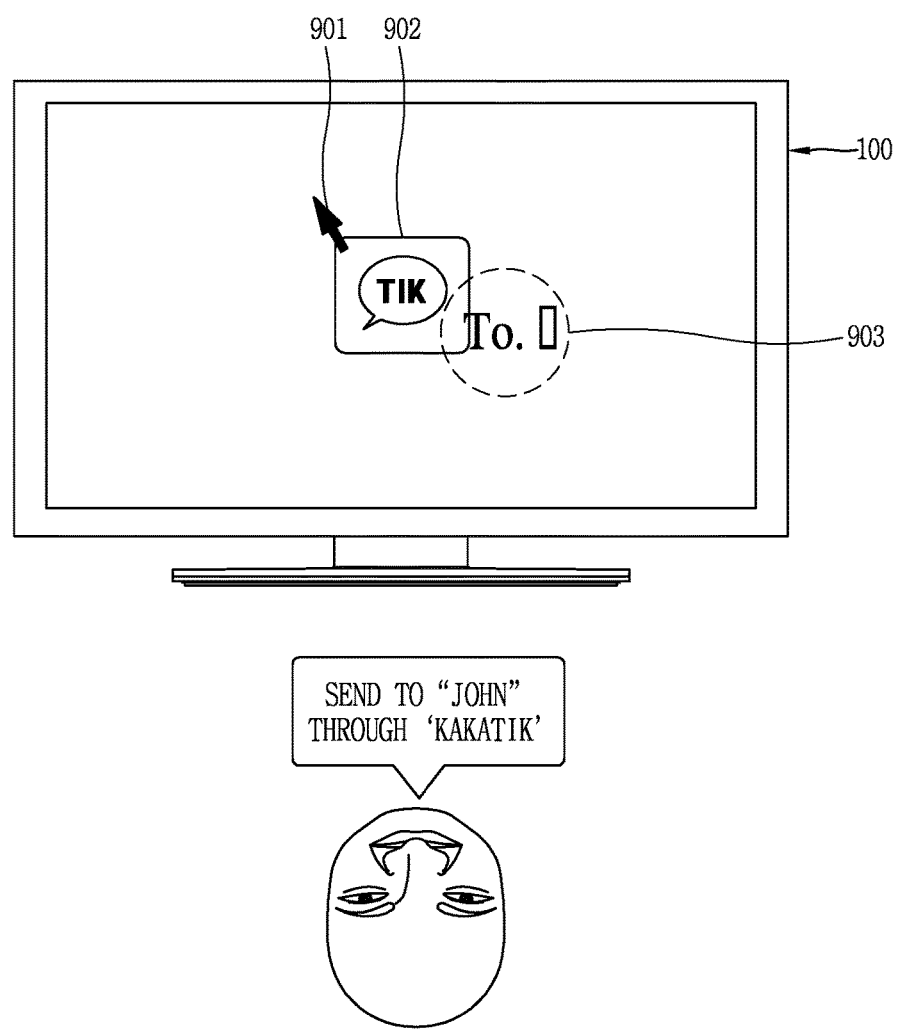
FIGS. 9A to 9C are conceptual views illustrating an example in which an icon indicating additional information is further attached to a pointer with a representative image attached thereto, based on an input voice signal, in accordance with an embodiment of the present invention.
Figure 9B:
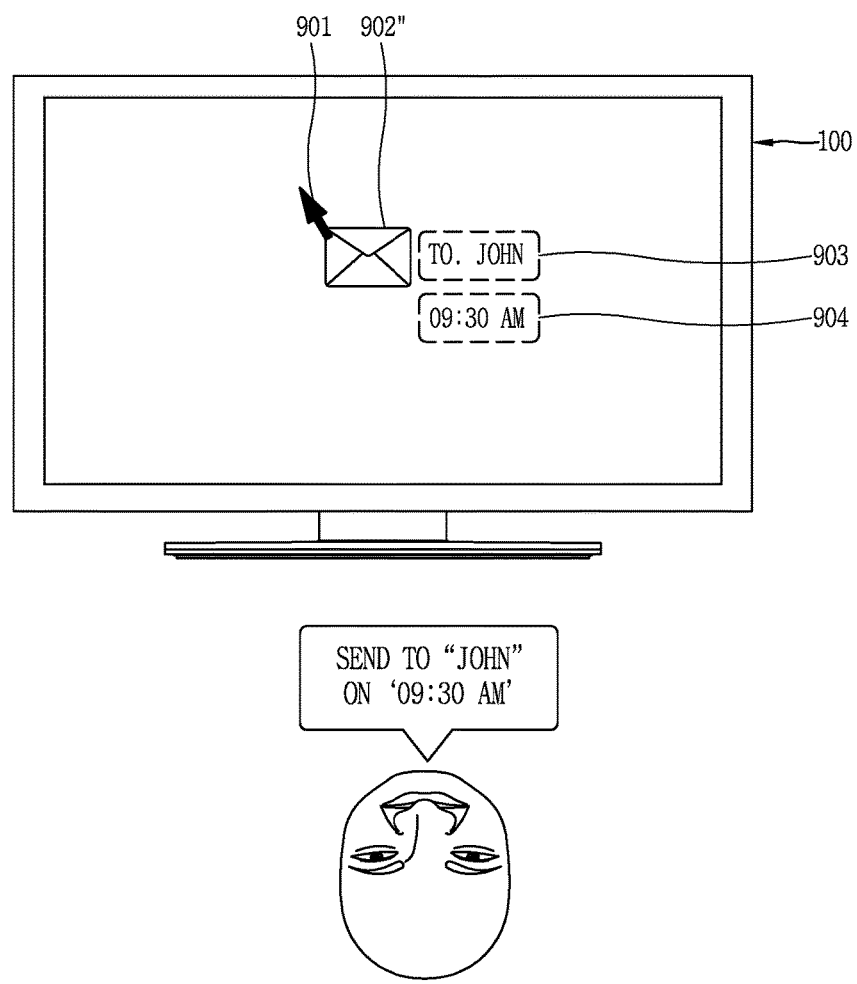
Figure 9C:
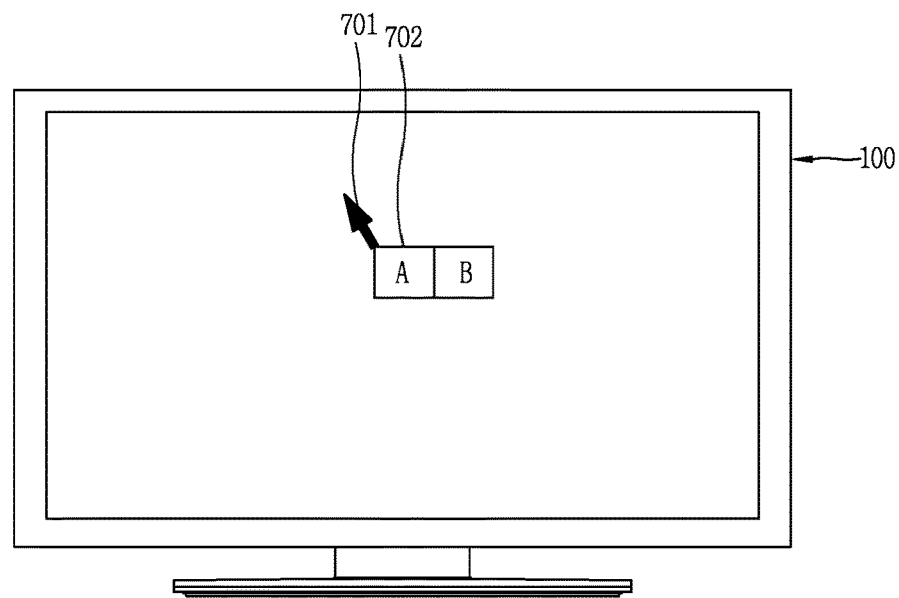

Meanwhile, FIGS. 9A to 9C illustrate a method of outputting additional information on a pointer with a representative image attached thereto when the additional information related to a function corresponding to the representative image is included in the voice signal input in the steps S402 and S403.

When the first voice signal is input in the step S402, if it is determined that additional information related to the function to be executed is further included in the input first voice signal, the controller 150 may further generate an icon indicating the additional information and attach the generated icon to the representative image in the step S403.

Here, the additional information may refer to additional information related to the execution of the function included in the first voice signal. For example, when the function is 'transmit,' the additional information may include both essential information and selective information for transmission, such as 'transmission time, a recipient and a maximum response time.'

When the icon indicating the additional information is attached to the representative image, the controller 150 may control the icon to be moved along with the pointer while the pointer is moved.

Similar to the step S404, when a specific object or a specific region on the screen is selected by the pointer to which the representative image and the icon have been attached, the controller 150 may execute the function corresponding to the representative image with respect to the selected specific object, based on the additional information corresponding to the icon.

For example, referring to FIG. 9A, when the user inputs a voice 'Send to John through Kakatik,' a representative image 902 of 'Kakatik SNS service' and an image 903 indicating a recipient may be output by being attached to the pointer 901. On the other hand, referring to FIG. 9B, when a user's voice command includes a plurality of additional information, the image 903 indicating the recipient and text 904 indicating a time to transmit may be attached to a representative image 902" in a form of a list. The output icons 903 and 904 indicating the output additional information, similar to the aforementioned, may be hidden when a pointing signal is not input for a preset period of time (e.g., 2 seconds), and output again when the pointer 901 is moved.

In case where the first voice signal is recognized as a voice other than a control command, when the voice signal is input after the pointer with the representative image attached thereto is output, the controller 150 may recognize the input voice signal as a control command for editing the representative image, namely, text. For example, in a state that the 'Hong-gildong' text is attached to the pointer, when a voice command 'enlarge text' is input, a font of the output representative image may be enlarged.

Also, the controller 150 may control a region to output the representative image and a region to output the icon indicating the additional information to be distinguished from each other, and change an input order or input position by a user input.

For example, referring to FIG. 9C, a representative image may be attached to a region A adjacent to a pointer. Or, an icon indicating additional information may be attached to the region A adjacent to the pointer and the representative image may be attached to a region B away from the pointer. Or, such output regions may be decided according to an order corresponding to the first voice signal.

Hereinafter, description will be given of outputting a visual effect when the representative image (and/or the icon indicating the additional information) is attached to or detached from the pointer or changed, with reference to FIGS. 10A to 10D.

Prior to executing the step S402, the controller 140 may enter a voice recognition mode in response to a predetermined input signal. Here, the predetermined input signal may be generated in various manners (e.g., voice command, key input, gesture input, etc.). For example, the controller 150 may enter the voice recognition mode when a hot key provided on the spatial remote controller 200 is pushed.

When the entrance into the voice recognition mode is sensed, the controller 150 may recognize the voice of the first voice signal input in the step S402, and generate a representative image corresponding to the recognized voice.

Meanwhile, in the step S403, the method of attaching or detaching the generated representative image to or from the pointer or changing the generated representative image, and a method of outputting an effect related to the method may be various, or set or changed by a user input.

Figure 10A:
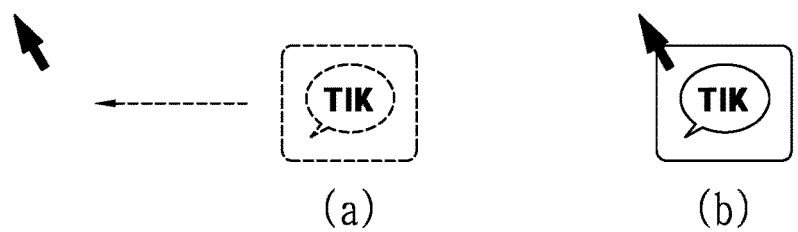
FIGS. 10A to 10D are conceptual views illustrating an example of outputting a visual effect when a representative image is attached to or detached from the pointer or is changed, in accordance with an embodiment of the present invention.

For example, as illustrated in FIG. 10A, the representative image may be attached to the pointer like a magnet (see (b) of FIG. 10A) while outputting a visual effect of coming toward the pointer (see (a) of FIG. 10A).

Also, when the entrance into the voice recognition mode is sensed, the controller 150 may first change a shape of the pointer to externally notify the entrance, and then attach the representative image generated according to the input voice signal to the shape-changed pointer in a manner of being overlaid on at least part of the pointer.

Figure 10B:
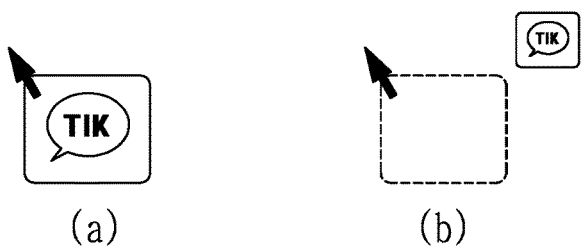
Figure 10C:
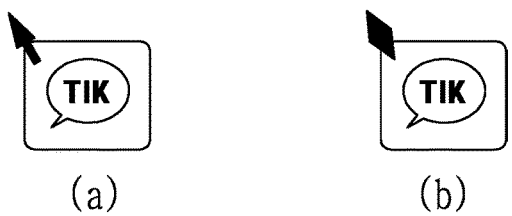

For example, as illustrated in FIG. 10C, in a state that a pointer in a shape of an arrow is output (see (a) of FIG. 10C), upon entering the voice recognition mode, the pointer may be changed into a diamond shape (not illustrated), and the representative image generated according to the input voiced signal may be attached in a manner of overlapping a part of the pointer in the diamond shape (see (b) of FIG. 10C).

Also, when a third voice signal is input after a first representative image is attached to a pointer in a voice recognition mode, the controller 150 may change the first representative image into a second representative image corresponding to the third voice signal. Here, the third voice signal may not be a voice command for changing the shape of the representative image but a voice command for changing the very representative image in order to change a function to be applied to a specific object. Therefore, to this end, the controller 150 may input a voice signal corresponding to a function to change within a predetermined time after first inputting a preset voice (e.g., 'change (or switch) the representative image'). In this instance, a visual effect may be output while the representative image is changed (or switched).

Figure 10D:
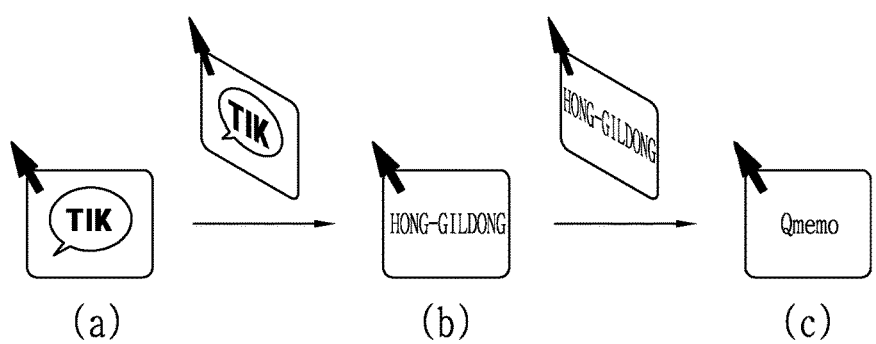

For example, referring to FIG. 10D, in a state that a representative image (see (a) of FIG. 10D) indicating 'Send to Kakatik' is attached to a pointer, when the representative image is sequentially changed (switched, converted) into a representative image (see (b) of FIG. 10D) indicating 'Hong-gildong' and a representative image (see (c) of FIG. 10D) indicating 'quick memo function,' in response to a voice signal, a visual effect that a previous representative image is changed into another representative image in a turning manner may be output.

In this manner, when the representative image is changed according to the voice signal, a function corresponding to the changed second representative image may be executed with respect to the selected specific object, in the step S405.

Meanwhile, when the voice recognition mode is released, the controller 150 may output a visual effect that the representative image is detached from the pointer, or control the representative image to disappear from the screen.

For example, as illustrated in FIG. 10B, in a state that the representative image is attached to the pointer (see (a) of FIG. 10B), the representative image may be detached or separated from the pointer, with outputting a visual effect that the representative image is gradually reduced in size to disappear from the screen (see (b) of FIG. 10B).

Hereinafter, a method of outputting a list of selected specific objects after the step S404 will be described.

In relation to this, FIGS. 11A to 11D are views illustrating thumbnail images of objects selected by a pointer with a representative image attached thereto.

After a specific object or specific region on the screen is selected by a representative image-attached pointer, when a fourth voice signal is input, the controller 150 may attach a thumbnail image of the selected specific object or specific region to the representative image.

The fourth voice signal may be a prestored specific voice command. When the fourth voice signal is input, the controller 150 may recognize it as a control command for outputting a thumbnail image of a selected object or region.

Figure 11A:
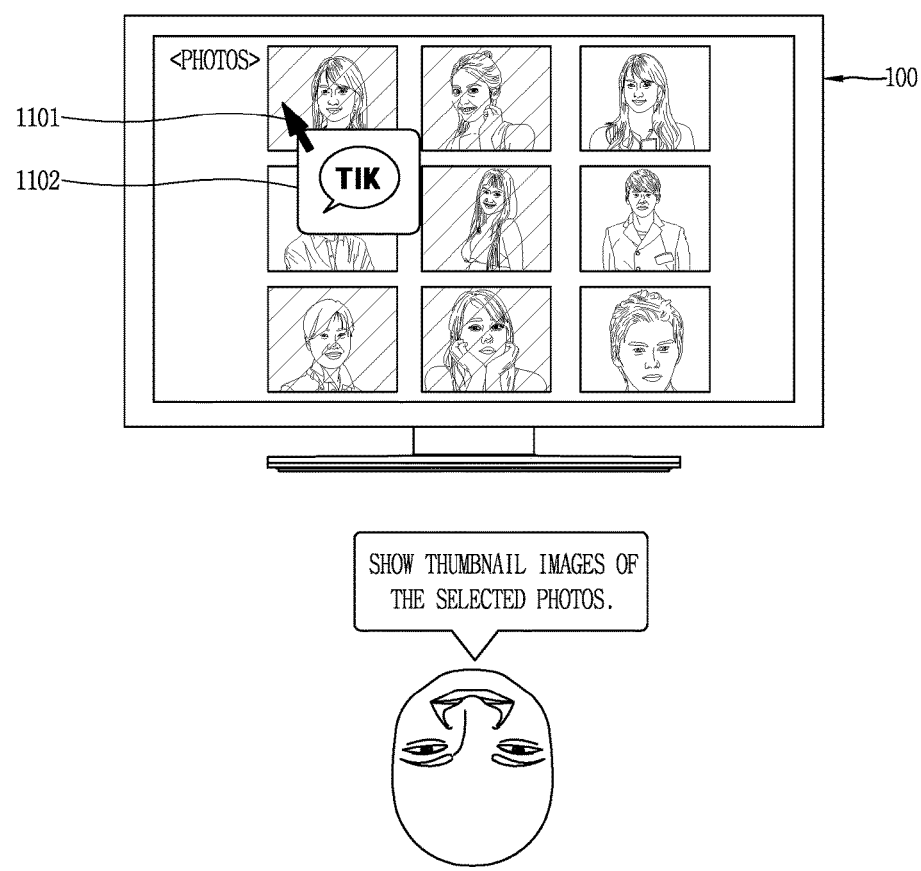
FIGS. 11A to 11D are views illustrating thumbnail images of objects selected by a pointer with a representative image attached thereto, in accordance with an embodiment of the present invention.

For example, as illustrated in FIG. 11A, in a state that a plurality of photos are selected by a pointer 1101, which has a representative image 1102 of 'Kakatik SNS transmission' attached thereto, when the user inputs a voice signal 'Show thumbnail images of the selected photos,' the controller 150 may recognize the voice signal as a control command for outputting the thumbnail images of the selected objects.

Figure 11B:
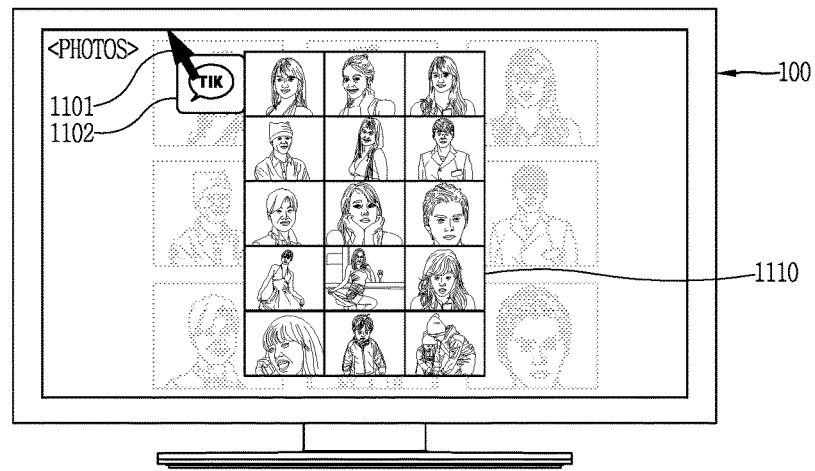

Accordingly, as illustrated in FIG. 11B, a list 1110 of thumbnail images of the selected objects may be output on the representative image 1102 of 'Kakatik SNS transmission.' In this instance, a background image may be processed to be blurred or semitransparent.

In this manner, while a thumbnail image of a selected object or region is output on a screen, the user can move a pointer to be on the thumbnail image by using the spatial remote controller 200.

To this end, although the attached representative image is moved according to the movement of the pointer, a thumbnail image or a list of thumbnail images may not be moved in response to the movement of the pointer. On the other hand, the attached thumbnail images are normally moved according to the movement of the pointer. However, when a predetermined control signal is applied (e.g., a specific key of the spatial remote controller is pushed), the attached thumbnail images may be detached from the pointer and be independently output on the screen.

In this state, when at least one of the thumbnail images is selected using the representative image-attached pointer, the controller 150 may control a specific object corresponding to the selected thumbnail image to be deselected.

Figure 11C:
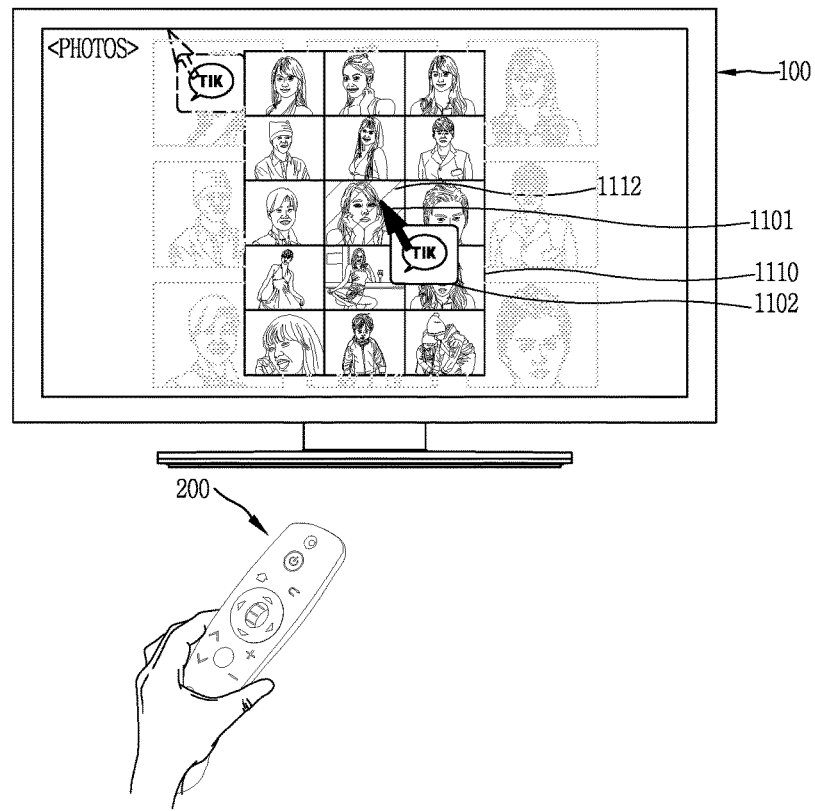

For example, referring to FIG. 11C, when the user pushes a specific key (not illustrated) provided on the spatial remote controller 200, the thumbnail image list 1110 may be detached from the representative image. That is, the thumbnail image list 1110 may not be moved any more according to the movement of the pointer. In this state, when the pointer 1101 with the representative image 1102 attached thereto is moved from the thumbnail image list 1110 to a specific image 1112 and selects (clicks) the specific image 1102, the corresponding image 1112 may be deselected and not be transmitted to the Kakatik SNS server. And, the image 1112 may disappear from the thumbnail image list 1110.

Meanwhile, the controller 150 may output a thumbnail image of an object for which the function corresponding to the first voice signal has already been executed, and a thumbnail image of an object for which the function corresponding to the first voice signal is to be executed to be visually distinguished from each other.

Figure 11D:
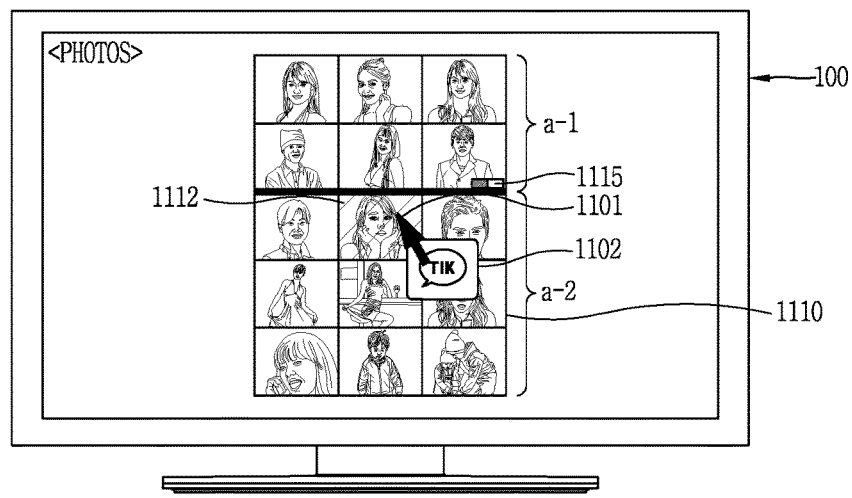

For example, referring to FIG. 11D, thumbnail images of objects which have already been uploaded on the Kakatik SNS server may be output on an upper region a-1 of the list 1110, and thumbnail images of objects which are to be updated on, namely, have not been completely transmitted yet to the Kakatik SNS server may be output on a lower region a-2 of the list 1110. On the other hand, as illustrated, transmission information, for example, a progress bar 1115 indicating a transmission degree may be output on one region of the list 1110.

Hereinafter, description will be given of a method of attaching a representative image to a pointer for output when a plurality of functions corresponding to an input voice signal are present, in relation to the steps S402 to S405. FIGS. 12A to 12D are conceptual views illustrating a method of outputting representative images when there are a plurality of functions corresponding to an input voice signal, in accordance with an embodiment of the present invention.

When it is recognized that the first voice signal includes a plurality of functions in the step S402, the controller 150 may generate a first representative image corresponding to a first function and a second representative image corresponding to a second function, respectively.

The generated first and second representative images may be attached to a pointer, respectively, in the step S403. In this instance, the first and second representative images may be moved according to a movement of the pointer. For example, as the pointer is moved, the controller 150 may control the first and second representative images to be moved with an effect of waving along a moving path of the pointer.

Figure 12A:
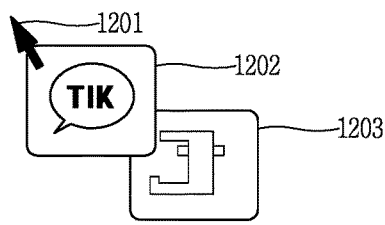
FIGS. 12A to 12D are conceptual views illustrating a method of outputting representative images when there are a plurality of functions corresponding to an input voice signal, in accordance with an embodiment of the present invention.
Figure 12B:
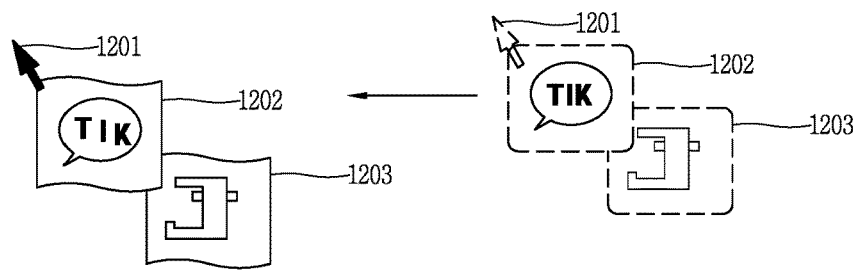

Referring to FIGS. 12A and 12B, a first representative image 1202 corresponding to a first function and a second representative image 1203 corresponding to a second function may be attached to a pointer 1201 in an overlaying manner with each other. When the pointer 1201 is moved from right to left using the spatial remote controller 200, the first and second representative images 1202 and 1203 may be moved along with the pointer 1201, with outputting an effect of waving in the wind on the basis of a moving direction and a moving speed of the pointer 1201.

In this manner, when a plurality of functions to be executed are present, the controller 150 may first execute a first function corresponding to a first representative image and then execute a second function corresponding to a second representative image after completion of the first function, with respect to all of the selected objects. As another example, the first function and the second function may be executed with respect to each object in a simultaneous or sequential manner.

Figure 12C:
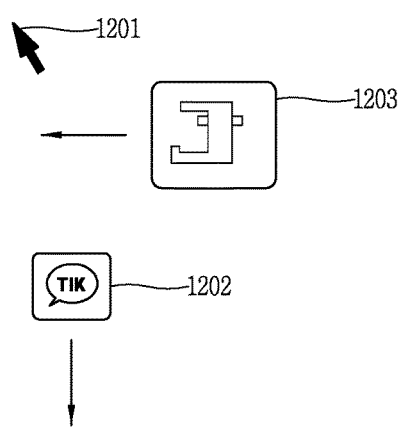
Figure 12D:
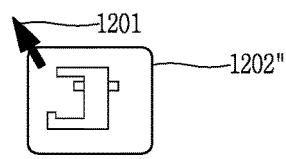

For the former, the controller 150 may attach the first representative image corresponding to the first function, which is to be executed earlier, closer to the pointer. When the first function has been executed with respect to all of the selected objects, as illustrated in FIG. 12C, the controller 150 may control the first representative image 1202 to be detached from the pointer 1201 or disappear from the screen (here, a visual effect that the first representative image is dropped on a floor is exemplarily illustrated). Afterwards, the controller 150 may attach the second representative image corresponding to the second function, which is to be executed next, close to the pointer (1202″).

Although not illustrated, after the step S405, the controller 150 may output an execution result of the function corresponding to the representative image attached to the pointer.

In detail, if the function is to output text on an input window, an execution result is simultaneously shown on the screen. However, for an execution result of a function, such as 'transmit,' which can be recognized only after executing another application, when transmission to all of the selected objects is completed, the corresponding application may be automatically executed and show the execution result of the transmission. To this end, a current screen may be output on a first region of the display unit 170 and execution results of a function applied to the selected objects may be output on a second region in real time.

Also, in the step S405, an indicator, for example, a progress bar, which indicates a progressing degree of a function corresponding to a representative image, may further be output adjacent to the pointer or the representative image attached to the pointer.

Upon completion of the step S405, the representative image attached to the pointer may be separated and the second pointer may be switched back into the first pointer immediately or after the release of the voice recognition mode. In this instance, a history of the representative images corresponding to pre-executed functions may be stored in the storage unit 160, and a list of previously-output representative images may be displayed on the screen according to a user input.

In this instance, when the pointer is moved to a specific representative image of the output list, the corresponding representative image may be attached to the pointer like a magnet. Accordingly, the steps S401 to S403 may also be executed at once.

As described above, in an image display apparatus and a method of operating the same according to the present invention, when a user inputs a voice command, an icon indicating a function corresponding to the input voice command may be attached to a pointer or cursor. This may allow the user to immediately recognize an operation or function desiring to execute from outside and enable a feedback thereof. Also, the icon may be moved according to a movement of the pointer. When a specific object is selected by the pointer, a function corresponding to the icon attached to the pointer can immediately be executed for the selected object. Specifically, this may provide user convenience when the user desires to execute the same function for a plurality of objects or should repetitively perform the same operation.

In addition, it will be understood by those skilled in the art that the present invention can be implemented in other detailed embodiments without change inn technical scope or features of the present invention. Therefore, the foregoing embodiments are merely illustrative and it should be understood that the present invention is not limited to those embodiments. The scope of the present invention is defined by the following claims other than the detailed description. Thus, it is intended that the present invention cover modifications and variations of this invention provided they come within the scope of the appended claims and their equivalents.

The invention claimed is:

1. An image display apparatus comprising:
a microphone;
a display configured to display a pointer on a screen; and
a hardware controller operably coupled to the microphone and the display and configured to:
receive a first voice signal through the microphone while the pointer is displayed on the screen,
cause the display to display a first image indicating a first function corresponding to the first voice signal, wherein the first image is displayed along with the pointer and attached to the pointer,
cause the display to display the first image attached to the pointer along a moving path of the pointer, in response to the movement of the pointer on the screen,
execute the first function associated with the first image for a first object when the first object on the screen is selected using the pointer with the first image attached thereto, and
execute the first function associated with the first image for a second object when the second object on the screen is selected using the pointer while the pointer with the first image attached thereto is displayed,
receive a second voice signal for changing the first image through the microphone while the pointer with the first image attached thereto is displayed, and cause the display to display a second image indicating a second function corresponding to the second voice signal, wherein the second image is displayed along with the pointer and attached to the pointer instead of the first image.

2. The apparatus of claim 1, wherein the hardware controller, when a voice indicating a predetermined function is included in the first voice signal,
generates the first image by detecting another image associated with the first function from a memory or a predetermined web server, and
controls the first image to be continuously output in the attached state to the pointer after executing the first function associated with the first image to the selected first object.

3. The apparatus of claim 1, further comprising a receiver configured to receive from an external input device a pointing signal for moving the pointer with the first image or the second image attached thereto.

4. The apparatus of claim 1, wherein the hardware controller controls the first image or the second image attached to the pointer to be hidden when the movement of the pointer is not sensed for a preset period of time and the hidden image to be output again in response to the pointer being moved, in the state that the first image or the second image is attached to the pointer.

5. The apparatus of claim 1, wherein the hardware controller controls a preset animation effect or a predetermined notification sound to be output when the first or second image is attached to the pointer in response to the input of the first or second voice signal.

6. The apparatus of claim 1, wherein the hardware controller controls at least one object corresponding to another voice signal to be selected based on a specific region of the screen when the another voice signal is input in a state that the pointer with the first or second image attached thereto has been moved to the specific region of the screen.

7. The apparatus of claim 1, wherein the hardware controller generates a third image indicating additional information related to the first function, attaches the third image to the first image, and controls the third image to be moved according to the movement of the pointer, when the additional information related to the first function is included in the first voice signal.

8. The apparatus of claim 7, wherein the hardware controller, when a specific object on the screen is selected using the pointer with the third image and the first image attached thereto, controls the first function associated with the first image to be applied to the selected first object based on the additional information corresponding to the third image.

9. The apparatus of claim 1, wherein the hardware controller generates the first image corresponding to the first voice signal when an entrance into a voice recognition mode is sensed based on an input signal.

10. The apparatus of claim 9, wherein the hardware controller, when the entrance of the voice recognition mode is sensed, changes a shape of the pointer, and attaches the first image to the pointer in a manner of overlaying at least part of the pointer with the changed shape.

11. The apparatus of claim 9, wherein the hardware controller controls the display to output a visual effect that the first or second image is detached from the pointer or the first or second image to disappear from the screen when the voice recognition mode is released, and outputs only an indicator corresponding to a selection when a specific object on the screen is selected using the pointer from which the first or second image has disappeared.

12. The apparatus of claim 1, wherein the hardware controller, when another voice signal is input through the microphone after specific objects are selected using the pointer with the second image attached thereto, controls the display to attach thumbnail images of the selected specific objects to the second image.

13. The apparatus of claim 12, wherein the hardware controller controls the thumbnail images not to be moved according to the movement of the pointer, and
controls a specific object corresponding to at least one selected thumbnail image to be deselected when the at least one thumbnail image is selected from the thumbnail images using the pointer with the second image attached thereto.

14. The apparatus of claim 12, wherein the hardware controller controls the display to output thumbnail images of objects for which the second function corresponding to the second voice signal has been executed and thumbnail images of objects for which the second function is to be executed, in a visually distinguishing manner.

15. The apparatus of claim 1, wherein the hardware controller, when it is recognized that a plurality of functions are included in the first voice signal, generates the first image corresponding to the first function and a third image corresponding to a third function, respectively, and attaches the first and third images to the pointer, and
controls the first and third images to be moved according to the movement of the pointer.

16. The apparatus of claim 15, wherein the hardware controller controls the first image corresponding to the first function, which is to be executed earlier, to be attached closer to the pointer, and
controls the first image to be detached from the pointer or disappear when the first function is executed, and controls the third image corresponding to the third function, which is to be executed next, to be attached close to the pointer.

17. The apparatus of claim 1, wherein the hardware controller, when a voice indicating a predetermined function is not included in the first voice signal, generates a text image converted from the first voice signal through voice recognition, as the first image, and
outputs the text image on a specific object when the specific object on the screen is selected using the pointer with the first image attached thereto.

18. The apparatus of claim 1, wherein when the second voice signal is received, a visual effect that the first image is changed into the second image in a turning manner is output.

19. A method for operating an image display apparatus, the method comprising:
displaying a pointer on a screen of a display of the image display apparatus, the pointer being moved according to a pointing signal received from an external input device;
receiving, by a microphone, a first voice signal through the microphone while the pointer is displayed on the screen;
displaying, on the display, a first image indicating a first function corresponding to the first voice signal, wherein the first image is displayed along with and attached to the pointer, displaying, on the display, the first image attached to the pointer along a moving path of the pointer, in response to the movement of the pointer on the screen;

executing, by a hardware controller, the first function associated with the first image for a first object when the first object on the screen is selected using the pointer with the first image attached thereto; and executing, by the hardware controller, the first function associated with the first image for a second object when the second object on the screen is selected using the pointer while the pointer with the first image attached thereto is displayed, receiving a second voice signal for changing the first image through the microphone while the pointer with the first image attached thereto is displayed, and displaying a second image indicating a second function corresponding to the second voice signal wherein the second image is displayed along with the pointer and attached to the pointer instead of the first image.

20. The method of claim 19, wherein when a voice indicating a predetermined function is included in the first voice signal, generating the first image by detecting another image associated with the first function from a memory or a predetermined web server, and executing the first function associated with the first image to the selected first object and thereafter controlling the first image to be continuously output in the attached state to the pointer.

* * * * *